US011590422B2

(12) United States Patent
Matsushita et al.

(10) Patent No.: US 11,590,422 B2
(45) Date of Patent: Feb. 28, 2023

(54) STORAGE MEDIUM HAVING INFORMATION PROCESSING PROGRAM STORED THEREIN, INFORMATION PROCESSING SYSTEM, INFORMATION PROCESSING APPARATUS, AND INFORMATION PROCESSING METHOD

(71) Applicant: NINTENDO CO., LTD., Kyoto (JP)

(72) Inventors: Shingo Matsushita, Kyoto (JP); Ryosuke Kakutani, Kyoto (JP); Yuji Ohashi, Kyoto (JP); Kouhei Maeda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/061,913

(22) Filed: Oct. 2, 2020

(65) Prior Publication Data

US 2021/0101080 A1  Apr. 8, 2021

(30) Foreign Application Priority Data

Oct. 3, 2019 (JP) .............................. JP2019-182705

(51) Int. Cl.
*A63F 13/58* (2014.01)
*A63F 13/69* (2014.01)

(52) U.S. Cl.
CPC .............. *A63F 13/58* (2014.09); *A63F 13/69* (2014.09)

(58) Field of Classification Search
CPC ................................. A63F 13/58; A63F 13/69
See application file for complete search history.

(56) References Cited

U.S. PATENT DOCUMENTS

| 2008/0045283 A1* | 2/2008 | Stamper | A63F 13/58 463/1 |
| 2012/0088586 A1* | 4/2012 | Watkins, Jr. | A63F 13/35 463/42 |
| 2014/0080558 A1* | 3/2014 | Knutsson | A63F 13/573 463/10 |
| 2014/0087836 A1* | 3/2014 | Sato | A63F 13/822 463/23 |

(Continued)

OTHER PUBLICATIONS

[ONLINE] "Learn with Sharena! Fire Emblem Heroes Inheriting Hero Skills", Nintendo Co., Ltd., [searched on Sep. 24, 2019], [printed on [[2019]]Oct. 2, 2020], internet <https://guide.fire-emblem-heroes.com/en-US/sa003/>, 5 pages.

*Primary Examiner* — Jay Trent Liddle
(74) *Attorney, Agent, or Firm* — Nixon & Vanderhye P.C.

(57) ABSTRACT

An example of an information processing system executes an application including a plurality of games using characters to each of which at least one of a plurality of skills influencing progress of a game is added. In a first game that is one of the plurality of games, a possessed character that is a character possessed by a user is used. The information processing system adds at least one skill that satisfies a condition for being designated by the user, among the plurality of skills, to the possessed character on the basis of designation by the user. In a second game different from the first game among the plurality of games, a use character prepared to be used in the second game is used. The information processing system adds at least one skill among the plurality of skills to the use character in accordance with progress of the second game.

19 Claims, 10 Drawing Sheets

(56) References Cited

U.S. PATENT DOCUMENTS

| | | | |
|---|---|---|---|
| 2014/0128165 A1* | 5/2014 | Ganz | A63F 13/30 |
| | | | 709/204 |
| 2014/0364220 A1* | 12/2014 | Kim | A63F 13/58 |
| | | | 463/31 |
| 2018/0028906 A1* | 2/2018 | Tang | G06F 3/04842 |
| 2018/0165701 A1* | 6/2018 | Onda | A63F 13/79 |
| 2018/0214775 A1* | 8/2018 | Karashima | A63F 13/335 |
| 2021/0101080 A1* | 4/2021 | Matsushita | A63F 13/58 |

\* cited by examiner

STORAGE MEDIUM HAVING INFORMATION PROCESSING PROGRAM STORED THEREIN, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2019-182705, filed on Oct. 3, 2019, the entire contents of which are incorporated herein by reference.

FIELD

The present disclosure relates to a storage medium having stored therein an information processing program for executing a game, an information processing system, an information processing apparatus, and an information processing method.

BACKGROUND AND SUMMARY

Conventionally, addition of a skill to a character used in a game is performed under a certain condition.

In the above game, since a certain condition needs to be satisfied in order to add a skill to a character, it is also considered that a user cannot easily add a skill to a character in some cases. When the user cannot easily add a skill, it is also considered that the user may no longer use the function of adding a skill to a character. Thus, there is room for improvement in causing the user to use the function of adding a skill.

Therefore, the present application discloses a storage medium having an information processing program stored therein, an information processing system, an information processing apparatus, and an information processing method which can make it easier for a user to use a function of adding a skill to a character.

(1) An example of a storage medium described in the present specification is a non-transitory computer-readable storage medium having stored therein an information processing program for causing one or more processors of an information processing apparatus to execute an application. The application includes a plurality of games using characters to each of which at least one of a plurality of skills influencing progress of a game is added. The information processing program causing the one or more processors to execute: executing a first game that is one of the plurality of games and uses a possessed character that is a character possessed by a user; adding at least one skill among the plurality of skills to the possessed character on the basis of designation by the user, wherein said at least one skill satisfies a condition for being designated by the user; executing a second game that is different from the first game among the plurality of games and uses a use character prepared to be used in the second game; and adding at least one skill among the plurality of skills to the use character in accordance with progress of the second game.

According to the configuration of the above (1), since the user can add a skill to the use character different from the possessed character by advancing the second game, it is made easier for the user to use a function of adding a skill to a character.

(2) The information processing program may further cause the one or more processors to execute setting a character corresponding to the use character, to be the possessed character, when a giving condition for giving the character to the user is satisfied in the application.

(3) The one or more processors may execute a first game using the possessed character that is a character possessed by the user, among the characters. The one or more processors may execute a second game using the use character prepared to be used in the second game, among the characters.

According to the configuration of the above (2) or (3), motivation to use, in a normal game, the possessed character corresponding to the use character in the skill trial game can be given to the user, and motivation to play the normal game can be given to the user.

(4) When the same skill is added to each of the possessed character and the use character that correspond to each other, the skill may have the same influence on the progress of the second game in which the use character is used, as on progress of the first game in which the possessed character is used.

According to the configuration of the above (4), from the use character to which a skill is added in the second game, the user can easily infer the ability of the possessed character to which the skill is added in the first game. Accordingly, stronger motivation to play the first game can be given to the user.

(5) The one or more processors may add at least one skill selected from among the plurality of skills according to a predetermined rule, to the use character.

According to the configuration of the above (5), the user can add a skill to the use character according to the predetermined rule.

(6) The one or more processors may add a skill designated by the user among skills selected from among the plurality of skills by random selection, to the use character.

According to the configuration of the above (6), since skills to be added to the use character are selected on the basis of the random selection, the user can try various skills. Accordingly, the entertainment characteristics regarding addition of a skill can be improved.

(7) The one or more processors may add a skill to the use character each time a progress condition regarding the progress of the second game is satisfied.

According to the configuration of the above (7), since a skill is repeatedly added to the use character by repeatedly playing the second game, motivation to use the function of adding a skill can be given to the user each time the user plays the second game.

(8) When the progress condition is satisfied, the one or more processors may add a skill to the use character that satisfies a character condition regarding the second game, among a plurality of the use characters used for satisfying the progress condition.

According to the configuration of the above (8), since the user plays the second game such that a use character to which the user desires to add a skill can satisfy the character condition, the strategic characteristics of the second game can be improved, and the entertainment characteristics of the second game can be improved.

(9) The one or more processors may limit a number of times the user plays the second game per unit period.

According to the configuration of the above (9), indefinitely adding a skill to the use character by indefinitely repeating the game can be inhibited, thereby improving the strategic characteristics of the second game.

(10) The plurality of skills may be classified into a plurality of groups. A predetermined number of skills may be allowed to be added to one use character per group.

According to the configuration of the above (10), a plurality of skills can be added to the use character, so that the entertainment characteristics of the second game can be improved.

(11) When newly adding, to the use character to which the predetermined number of skills in the same group have been added, a skill in the group, the one or more processors may delete one of the already added skills and adds the new skill to the use character.

According to the configuration of the above (11), when adding a new skill to the use character, the user does not have to delete a skill already added to the use character, so that user's operations in the second game can be simplified.

(12) The one or more processors may add a skill to the possessed character on a condition that an in-application asset possessed by the user in the application is consumed. The one or more processors may add a skill to the use character without consuming the in-application asset as a condition.

According to the configuration of the above (12), by making it easier to add a skill to the use character than to add a skill to the possessed character, motivation to play the second game can be given to the user.

(13) At least one skill may be associated with each possessed character. When adding, to a certain possessed character, a skill that is not associated with the possessed character, the one or more processors may add the skill to the possessed character on a condition that the in-application asset is consumed. The one or more processors may permit both a skill that is associated with the use character and a skill that is not associated with the use character, to be added to the use character without consuming the in-application asset.

According to the configuration of the above (13), variations in combinations of the use character in the second game and a skill to be added to the use character can be increased.

(14) The one or more processors may present both a skill that is associated with the use character and a skill that is not associated with the use character, as candidates, and may add a skill designated by the user among the candidates, to the use character.

According to the configuration of the above (14), since the user can designate a skill to be added to the use character, the convenience of the user regarding addition of a skill can be improved.

(15) At least one skill among the plurality of skills may be associated with the in-application asset. When adding, to a certain character, a skill that is not associated with the character, the one or more processors may add a skill associated with the in-application asset possessed by the user in the application, to the character at least on a condition that the in-application asset is consumed.

According to the configuration of the above (15), the strategic characteristics regarding addition of a skill to the possessed character can be improved, and the entertainment characteristics of the game can be improved.

(16) The one or more processors may give the in-application asset and/or a type of an asset that is different from the in-application asset and convertible into the in-application asset, to the user in accordance with the progress of the second game.

According to the configuration of the above (16), stronger motivation to play the second game can be given to the user.

(17) A skill use condition that is satisfied by advancing the first game may be set for skills added to the possessed character. The information processing program may further cause the one or more processors to execute setting a skill for which the skill use condition is satisfied, among the skills added to the possessed character, to be in a state where the skill is used by the possessed character to which the skill is added. The one or more processors may set a skill added to the use character to be in a state where the skill is used by the possessed character, regardless of whether or not the skill use condition is satisfied.

According to the configuration of the above (17), by making it easier to make a skill usable for the use character to make a skill usable for the possessed character, motivation to play the second game can be given to the user.

The present specification discloses an information processing system, an information processing apparatus, or a server each including the entirety or a part of the means configured to execute the processes in the above (1) to (17). Moreover, the present specification discloses an information processing method to be executed in the configurations of the above (1) to (17).

According to the storage medium, the information processing system, the information processing apparatus, and the information processing method, it can be made easier for the user to use the function of adding a skill to a character.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Information Processing System

Figure 1:
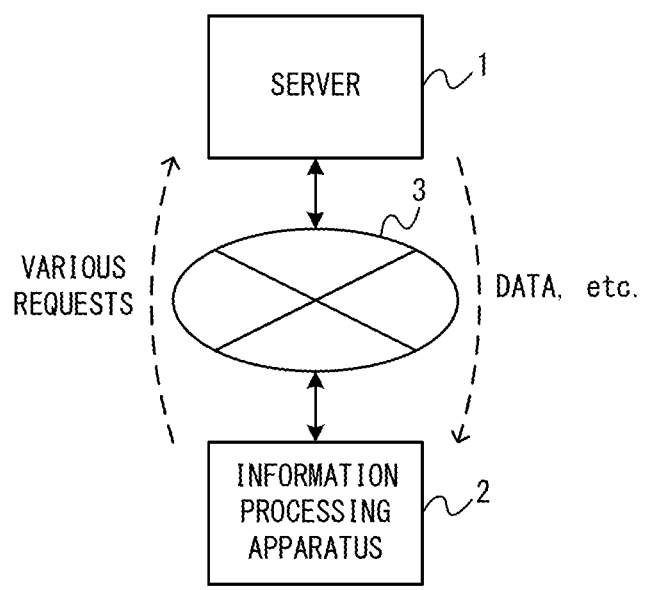
FIG. 1 is a block diagram showing an example of the configuration of a non-limiting information processing system according to an embodiment.

Hereinafter, an information processing system, an information processing program, and an information processing method according to the present embodiment will be described. Firstly, description will be given of the overall configuration of the information processing system and the configurations of the information processing apparatus and a server included in the information processing system according to the present embodiment. FIG. 1 is a block diagram showing an example of the configuration of the information processing system according to the present embodiment. As shown in FIG. 1, the information processing system includes a server 1 and an information processing apparatus 2. The server 1 and the information processing apparatus 2 are connectable to a network 3, such as the Internet and/or a mobile communication network. The server 1 and the information processing apparatus 2 are communicable with each other via the network 3.

The server 1 is a server for providing services related to an application (specifically, a game application) to be executed in the information processing apparatus 2. In the present embodiment, the server 1 is a game server for a game to be executed in the information processing apparatus 2, and provides an environment for a game process to be executed in the information processing apparatus 2. For example, in response to a request from the information processing apparatus 2 that executes the game process, the server 1 executes a game process according to need, and transmits, to the information processing apparatus 2, data complying with the request (refer to FIG. 1).

The information processing apparatus 2 is an example of a terminal device possessed by a user. Examples of the information processing apparatus 2 include a smart phone, a hand-held or stationary game apparatus, a mobile phone, a tablet terminal, a personal computer, and a wearable terminal. The information processing apparatus 2 is able to execute a game program (in other words, a game application) for a game for which the server 1 provides services.

(Specific Example of Configuration of Server 1)

Figure 2:
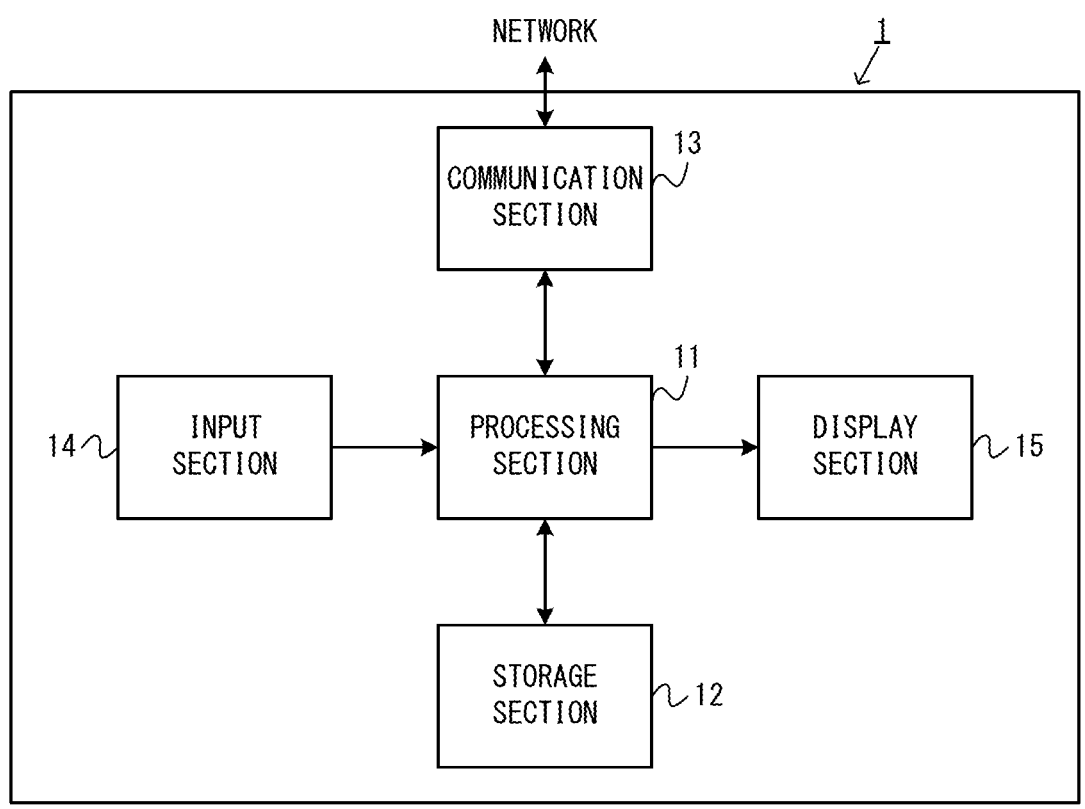
FIG. 2 is a block diagram showing an example of the configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 stores therein at least a program for a game process that is to be executed on the server side for a game process to be executed in the information processing apparatus 2.

The server 1 includes a communication section 13. The communication section 13 is connected to the network 3, and has a function of communicating with other devices (e.g., the information processing apparatus 2) via the network 3. The server 1 further includes an input section 14 and a display section 15 as input/output interfaces.

(Specific Example of Configuration of Information Processing Apparatus 2)

Figure 3:
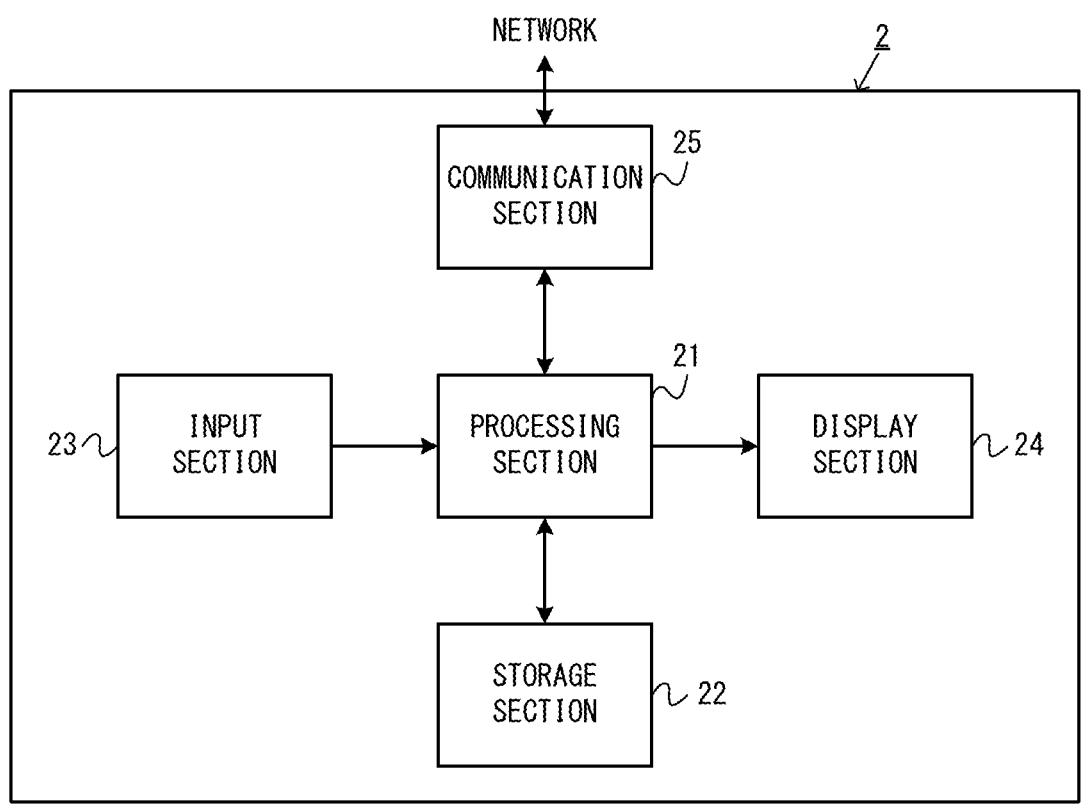
FIG. 3 is a block diagram showing an example of the configuration of a non-limiting information processing apparatus.

FIG. 3 is a block diagram showing an example of the configuration of the information processing apparatus 2. As shown in FIG. 3, the information processing apparatus 2 includes a processing section 21 and a storage section 22. The processing section 21 is electrically connected to the components 22 to 25 of the information processing apparatus 2. The processing section 21 includes a CPU (in other words, a processor) and a memory. In the information processing apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the information processing apparatus 2, or may be a storage medium (e.g., a card type storage medium) attachable/detachable with respect to the main body unit. The program may be stored in the main body unit by being downloaded from the server 1 to the information processing apparatus 2.

The information processing apparatus 2 includes an input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the information processing apparatus 2, or may be an input device (e.g., a game controller) separated from the main body unit.

The information processing apparatus 2 includes a display section 24. The display section 24 displays an image (e.g., a game image, etc.) that is generated through information processing executed in the processing section 21 of the information processing apparatus 2. The display section 24 may be a display device provided in the main body unit of the information processing apparatus 2, or may be a display device separated from the main body unit. The information processing apparatus 2 may include a speaker, a microphone, and/or a camera, etc.

The information processing apparatus 2 includes a communication section 25. In the present embodiment, the communication section 25 has a function of performing communication while being connected to a mobile communication network (in other words, a mobile telephone communication network). That is, the information processing apparatus 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the information processing apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

2. Outline of Processing in Information Processing System

Hereinafter, the outline of processing that is executed in the information processing system according to the present embodiment will be described. In the present embodiment, in the information processing system, a game using game characters (hereinafter, referred to simply as "characters") is executed in an application. In the present embodiment, a simulation game in which a character as a unit (in other words, a piece) is caused to fight with an enemy unit is executed. It should be noted that the type of game using characters is arbitrary, and may be a puzzle game or a role playing game. In addition, the characters are, for example, persons who appear in the game, but the characters are not limited to the persons as long as the characters have individuality in setting of the game. The characters may be, for example, animals, weapons, items, or the like.

(2-1. Possessed Character)

In the present embodiment, among the characters which appear in the game, characters possessed by a user in the application are referred to as "possessed characters". The possessed characters are characters that can be used in each of a plurality of games in the application (it should be noted that, in the present embodiment, as will be described later, a certain restriction is provided for the games in which the characters can be used).

In the present embodiment, when a predetermined giving condition is satisfied in the application, the information processing system gives a character to the user, thereby causing a state where the user possesses the character (as a possessed character). The method for giving a character to the user is arbitrary. For example, the information processing system may select a character by random selection that can be performed in exchange for a predetermined item, and may give the selected character to the user. It may be possible for the user to purchase an item for performing the random selection with real money. In addition, for example, it may be possible for the user to possess a character by purchasing the character itself with real money. Moreover, there may be a possessed character that is given to the user when a game is first started in the application. Furthermore, a predetermined character may be given to the user as a reward for achievement of a predetermined goal regarding a game in the application.

In the present embodiment, the application includes a plurality of types of games. That is, the information processing system can execute a plurality of games by executing the application. The "plurality of games" may each mean each of games that have common game rules but are distinguished from each other, such as a so-called story mode and event mode, or a one-player mode and a battle mode, or may each mean each of games having different game rules. The possessed characters can be used in a plurality of games (examples of a first game) excluding a skill trial game (an example of a second game) described later. In the present embodiment, games using possessed characters are sometimes referred to as "normal games" for the purpose of distinguishing from the skill trial game described later.

For each possessed character, one or more types of parameters indicating the strength of the possessed character (for example, level, attack power, defense power, etc.) are set. The parameters set for the possessed character are commonly used in each normal game. For example, when the level of a possessed character is 40 (that is, when the value of the parameter indicating the level is 40), the information processing system executes each of the normal games using the possessed character having a level of 40. In each normal game, a parameter that is set for a possessed character does not have to be used as it is, and, depending on a game, some correction may be performed on the parameter, and the corrected value of the parameter may be used. For example, in a specific game among the above normal games, a parameter of a specific character may be increased by a predetermined value. As described above, for each possessed character, a parameter that is commonly used in a plurality of normal games is set, and each of the plurality of normal games is executed on the basis of the parameter. Therefore, by strengthening (or growing) a possessed character, the user can use the strengthened possessed character in the plurality of normal games.

(2-2. Skill)

In the present embodiment, a character can be equipped with a skill. A skill is an ability that can influence the progress of a game in various ways. The content of the skill, in other words, the influence that can be exerted by the skill on the progress of the game is arbitrary, and may be, for example, as follows.

Skill to strengthen a character itself or an ally character (for example, increase attack power by 3, etc.).

Skill to weaken an enemy character (for example, decrease defense power by 5, etc.).

Skill to enable a character to use a specific ability (for example, enable the character to use a special attack, increase an amount of movement, or block movement of an enemy character, etc.).

The skill may be any skill with which some ability is set for a character when the character is equipped with the skill, and may be equipment (for example, a weapon or an armor) or an item with which the character is to be equipped, on the setting of the game. By using the character equipped with the above skill in the game, the user can advantageously advance the game.

In the present embodiment, a possessed character can possess skills for equipping the possessed character itself therewith. That is, the user is allowed to select some skills from among skills possessed by a possessed character and equip the possessed character with the selected skills.

In the present embodiment, a skill is classified into one of a plurality of groups. Specifically, there are seven skill groups, that is, a weapon skill group, a support skill group, a secret skill group, an A skill group, a B skill group, a C skill group, and an S skill group, and one skill belongs to one of the seven groups. For example, a skill regarding a weapon (for example, a silver sword, or the like) with which a character is equipped belongs to the weapon skill group. In addition, for example, a skill that allows a character to use a specific secret technique (in other words, a special attack) when the character is equipped with the skill belongs to a secrete skill group. In the present embodiment, a character can be simultaneously equipped with a predetermined number of skills (here, one skill) per group. Specifically, the character can be simultaneously equipped with one skill per one of the seven groups, that is, seven skills in total. The number of skills possessed by the character may be equal to or larger than the above predetermined number, and the character can possess a plurality of skills per group.

In the present embodiment, on the condition that skill points are consumed, it is possible to equip the character with some skills (for example, skills with which the character has not been equipped when the character becomes a possessed character) among a plurality of skills that can be possessed by the character. That is, in the present embodiment, regarding some skills, the possessed character cannot be equipped with the skills when the possessed character merely possesses the skills, and the possessed character can be equipped with the skills on the condition that skill points are consumed. The skill points are points to be used to equip the possessed character with skills, and the user can acquire skill points by advancing the game (for example, each time the possessed character defeats an enemy character in the game). Skill points may be set for each possessed character (that is, for one possessed character, skill points that can be used for this possessed character may be set), or may be set for each user (that is, one type of skill points may be set for one user).

As described above, in the present embodiment, the user can collect skill points by advancing the game, and can newly equip a possessed character with a skill among skills possessed by the possessed character, by consuming the collected skill points. In another embodiment, a condition for equipping a possessed character with a skill (that is, a skill use condition described later) is arbitrary. For example, in another embodiment, the information processing system may allow a possessed character to be equipped with a predetermined skill on the condition that the possessed character reaches a predetermined level, and may allow a possessed character to be equipped with a predetermined skill, by using a predetermined item for the possessed character.

In the present embodiment, since the number of skills with which a character can be equipped is one per group as described above, when a possessed character is equipped with a new skill, if the possessed character has been equipped with a skill in the same group as that of this skill, the skill with which the possessed character has been already equipped is removed. In the present embodiment, it is possible to equip the possessed character again with the skill that is removed from the equipment of the possessed character as described above, without consuming any skill point. That is, the user is allowed to freely (that is, without any condition) remove a skill with which a possessed character is equipped, from the equipment of the possessed character, and equip the possessed character with this skill.

In the present embodiment, a possessed character possesses a predetermined skill at the time of being given to the user. Specifically, for each character, the information processing system stores information that associates a skill possessed by the character at the time when the character is given as a possessed character, with the character. Such an association between a character and a skill is defined in the application. It can be said that a skill associated with a character is different from a skill that can be possessed by a character as a result of adding the skill to the character by skill inheritance described later, and is a skill originally possessed by the character. In the present embodiment, a skill associated with a character is sometimes referred to as a "basic skill" of the character. Meanwhile, a skill that is possessed by a character as a result of adding the skill to the character by skill inheritance described later is sometimes referred to as an "inheritance skill" of the character.

In the present embodiment, one or more skills are associated with each of characters that appear in a game. It should be noted that the characters may include characters with each of which any skill is not associated (that is, characters each of which does not possess any skill at the time when the character is given to the user).

In the present embodiment, the skills possessed by a possessed character cannot be moved to another possessed character, other than being moved to another possessed character by skill inheritance (that is, unless the possessed character is deleted). However, in another embodiment, each of a predetermined type of skills (for example, skills that belong to the above-described S skill group) may be able to be moved to another possessed character without deleting a possessed character that possesses the skill.

(2-3. Skill Inheritance)

In the present embodiment, the user can perform skill inheritance for a possessed character. The skill inheritance is an example of adding a skill to a possessed character, and a possessed character can be caused to inherit a skill different from the basic skill possessed in advance by the possessed character, from another possessed character (or an inheritance item described later). As a result of adding a skill to a possessed character by the skill inheritance, the number of skills possessed by the possessed character is increased, and the possessed character can be equipped with more types of skills. Hereinafter, the skill inheritance will be described with reference to FIG. 4.

Figure 4:
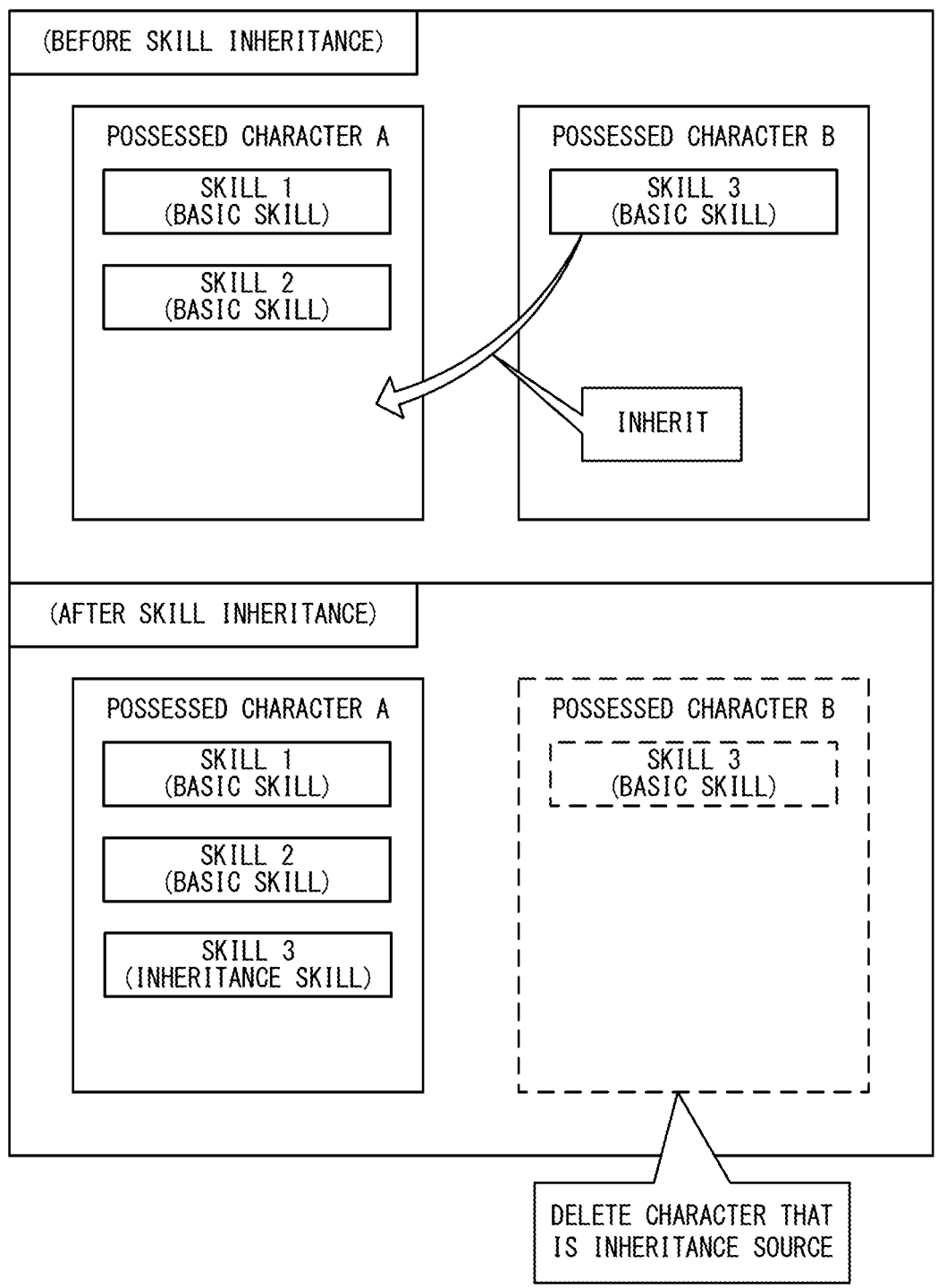
FIG. 4 shows an example of states of possessed characters before and after skill inheritance is performed.

FIG. 4 shows an example of states of possessed characters before and after skill inheritance is performed. FIG. 4 shows an example in which a possessed character A is caused to inherit a skill possessed by a possessed character B. In the example shown in FIG. 4, before the skill inheritance, the possessed character A which is the inheritance destination possesses a skill 1 and a skill 2 that are basic skills, and the possessed character B which is the inheritance source possesses a skill 3 that is a basic skill. In the case of performing the skill inheritance, the user designates a possessed character that is an inheritance destination (here, the possessed character A) and a possessed character that is an inheritance source (here, the possessed character B), and further designates a skill to be inherited (here, the skill 3). These designations are performed in a state where a predetermined setting screen in the application is displayed. In the setting screen, after performing the above designations, the user makes an instruction to perform the skill inheritance. In the present embodiment, in one skill inheritance, the user can designate a predetermined number of skills (for example, four skills) from among skills possessed by a possessed character that is an inheritance source.

When the skill inheritance is performed, the possessed character A which is the inheritance destination possesses the skill 3 as an inheritance skill (see FIG. 4). Here, in the present embodiment, in the above case, the possessed character B which is the inheritance source is deleted. That is, the possessed character B is removed from possession of the user.

In addition, in the present embodiment, the user can convert a possessed character into an item representing the possessed character (referred to as an "inheritance item"). Similar to a possessed character, a skill is associated with the inheritance item. Specifically, when a certain possessed character is changed to an inheritance item, skills that are the same as the skills that have been possessed by the possessed character are associated with the inheritance item. In the present embodiment, the user can perform the skill inheritance using the inheritance item instead of the possessed character B which is the inheritance source. At this time, the user designates a skill to be inherited, from among the skills associated with the inheritance item which is the inheritance source.

As described above, in the present embodiment, the skill inheritance is performed on the condition that a possessed character (or an inheritance item obtained by converting the possessed character) is consumed. Therefore, the user can add a skill to another possessed character by consuming a possessed character, thereby strengthening the other possessed character. Accordingly, the degree of freedom of skills caused to be possessed by a possessed character is improved, and thus the strategic characteristics of the game can be improved. In addition, a way of enjoyment of customizing a possessed character according to user's tastes can be provided to the user, and the entertainment characteristics of the game can be improved.

(2-4. Skill Trial Game)

As described above, in the present embodiment, a new skill can be added to a possessed character by the skill inheritance on the condition that a possessed character or an inheritance item is consumed. In addition, in the present embodiment, in addition to such skill inheritance for a possessed character, a skill trial game is prepared in the application in order to make it easier for the user to use the skill inheritance. Although described in detail later, the skill trial game is a game in which various skills can be added to a predetermined character (use character described later) in accordance with progress of the game. In the skill trial game, the user can add a skill to a character without consuming a possessed character or an inheritance item, and can experience the effect achieved by the skill inheritance. Hereinafter, the skill trial game will be described.

In the skill trial game, a character different from a possessed character is used. In the present embodiment, a character used in the skill trial game is referred to as a "use character". Unlike a possessed character, the use character is a character that can be used only in a specific game (here, the skill trial game). Unlike a possessed character, the use character is not given to the user by some condition, and cannot be used in any normal game other than the skill trial game. Therefore, it can be said that parameters that are set for the use character are parameters that can be used only in the skill trial game, and these parameters are different from the parameters of a possessed character which are commonly used in a plurality of normal games. In addition, although described in detail later, the skill trial game can be executed only in a predetermined game period. Thus, the use character can be used only in a predetermined period, and it can be said that the use character is different in this respect from a possessed character, which can be used in periods other than this period.

The use character may be a character corresponding to a character that is the same as a possessed character. That is, the use character may be a character having the same name and appearance as a possessed character. For example, in a situation in which the user possesses a certain character as a possessed character, the character may be used as the use character in the skill trial game in some cases. At this time, the possessed character and the use character have the same name and appearance, but the information processing system manages the possessed character and the use character as different characters. Therefore, even when the possessed character and the use character have the same name and appearance, the possessed character and the use character may have different values of set parameters (for example, level and attack power) and different possessed skills. In addition, the parameters and possessed skills of the possessed character are independent from those of the use character. Thus, even when any of the parameters and possessed skills of one of the possessed character and the use character is changed, the change is not reflected in the other of the possessed character and the use character.

Under a predetermined condition (for example, under a condition that the level is same), parameters having the same values as those of the possessed character corresponding to the use character may be set for the use character. However, even when the possessed character and the use character corresponding to the possessed character have the same level, the possessed character and the use character do not necessarily have to have parameters with the same value. For example, regarding characters having the same name and appearance, a plurality of types of characters having different parameter values may be prepared. In this case, even when a possessed character and a use character corresponding to the possessed character have the same level, the parameters of these characters do not necessarily agree with each other.

Figure 5:
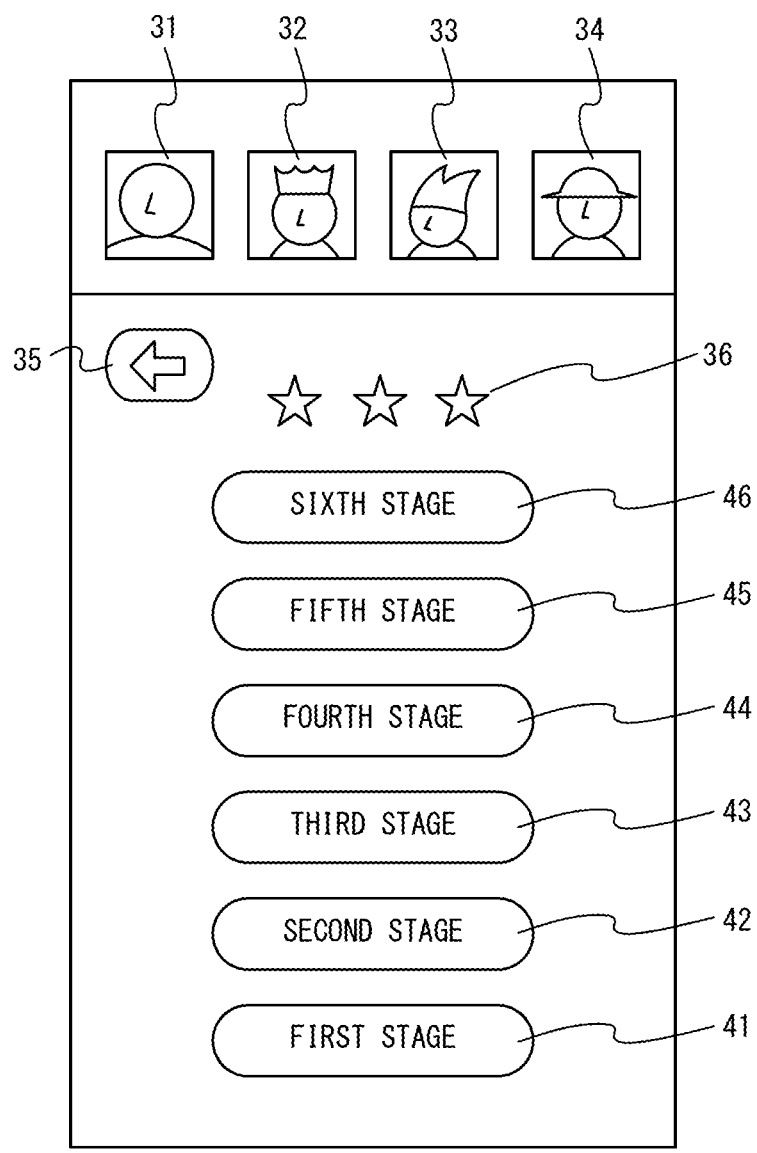
FIG. 5 shows an example of a non-limiting stage selection image.

In the present embodiment, the normal games and the skill trial game are each started when the user makes an instruction to start one of the normal games and the skill trial game in a predetermined menu in the application. In the present embodiment, when the skill trial game is started, the information processing apparatus 2 displays a stage selection image on the display section 24. FIG. 5 shows an example of the stage selection image. The stage selection image is an image that serves as a user interface for the user to select a stage in which a game is to be played, from among game stages included in the skill trial game.

As shown in FIG. 5, the stage selection image includes use character images 31 to 34 indicating use characters. In the present embodiment, in the skill trial game, predetermined characters are used as use characters. However, in another embodiment, the information processing system may set characters designated by the user from among characters that appear in the game, as use characters. For example, characters designated by the user from among a plurality of predetermined candidates may be used as use characters. In addition, in the present embodiment, the number of use characters used in the skill trial game is four, but may be arbitrary.

In the present embodiment, for each of use characters at the time when the skill trial game is first started, the level is set to an initial value (as one example, set to 1 in the present embodiment, but may be adjusted). That is, the level of each use character at the time of start of the skill trial game is the same as the level at the time when a corresponding possessed character is given to the user. In addition, each use character in the case where the skill trial game is first started possesses only a weapon skill and is equipped with only this weapon skill. In the present embodiment, this is because, unless a character is equipped with a weapon skill, the character cannot attack an enemy character in the game, so that the user cannot advance the game. In the present embodiment, in the skill trial game, one of the purposes is to add a skill to a use character as the game progresses, and thus the skill possessed by each use character in the initial state is set to the minimum as described above. As described above, the skill possessed by each use character (or with which each use character is equipped) in the case where the skill trial game is first started is different from the skill possessed by the corresponding possessed character (or with which the corresponding possessed character is equipped) at the time when the corresponding possessed character is given to the user. In another embodiment, the skill possessed by each use character (or with which each use character is equipped) in the case where the skill trial game is first started may be the same as the skill possessed by the corresponding possessed character (or with which the corresponding possessed character is equipped) at the time when the corresponding possessed character is given to the user.

As shown in FIG. 5, the stage selection image includes stage images 41 to 46 for the respective stages included in the skill trial game. In the example shown in FIG. 5, in the present embodiment, the skill trial game includes six stages, and the stage selection image includes the six stage images 41 to 46. As described above, in the present embodiment, in the skill trial game, a plurality of game stages are prepared, but the number of stages included in the skill trial game is arbitrary. In another embodiment, the skill trial game may include only one game stage. In the present embodiment, there are six stages from the first stage to the last sixth stage, the first stage has the lowest difficulty level, and the difficulty level increases as the stage progresses.

In a state where the stage selection image is displayed, the information processing apparatus 2 accepts an instruction to designate a stage to be played by the user (for example, an input of touching a stage selection image). When an instruction to designate a stage is accepted, the information processing system starts a game in the designated stage. In the present embodiment, when the skill trial game is first started, it is possible for the user to designate only the first stage. In addition, the user is allowed to designate any of a stage that has been already cleared, and the stage next to this stage. In the skill trial game, the user plays the game aiming to proceed to the stage as far as possible.

Here, in the present embodiment, the information processing system allows one skill trial game to be executed in a predetermined game period (for example, two weeks). In addition, play points for playing a game in each stage in the skill trial game are given to the user. It is assumed that the user can play the game in one stage once by consuming a predetermined number of play points (here, one play point). As shown in FIG. 5, the stage selection image includes a point image 36 indicating the number of the above play points (three play points in the drawing) possessed by the user. In the example shown in FIG. 5, the point image 36 represents the number of play points by star marks, and indicate that the user possesses three points as the play points.

In the present embodiment, in the game period, at a predetermined time every day, the information processing system gives play points to the user such that the play point(s) is restored to the upper limit (for example, three). Therefore, in the present embodiment, the user can play the game in one stage up to three times in one day (that is, up to 42 times in two weeks). As described above, in the present embodiment, the information processing system limits the number of times the user can play the skill trial game per unit period. Accordingly, the user cannot repeat the game indefinitely to strengthen a use character, but strengthens a use character within a limited number of times to clear the final stage. For example, the user plays the skill trial game while considering, for example, whether to play the game in a stage having as high a difficulty level as possible in order to advance the game as quickly as possible, or to play the game in a stage having a low difficulty level with priority on strengthening a use character. As described above, according to the present embodiment, the strategic characteristics of the skill trial game can be improved.

The condition for giving the above play points to the user is arbitrary. For example, in another embodiment, the play point(s) may be increased according to another condition different from the condition that it becomes the predetermined time comes every day. For example, the information processing system may give a predetermined number of points to the user in accordance with the user having advanced to a predetermined stage (for example, having cleared up to the third stage). Even in the case where such a condition is provided, it can be said that the number of times the user can play the skill trial game per unit period is limited.

In the present embodiment, the information processing system manages the number of times the user can play the skill trial game per unit period, on the basis of the number of play points. Here, information for managing the number of times is arbitrary. For example, in another embodiment, the information processing system may manage the number of times itself the user can play the game in one stage, as the information.

In the present embodiment, the game in each stage of the skill trial game is the same type of game as the normal games using possessed characters. That is, in the present embodiment, the game in each stage of the skill trial game is a simulation game in which a use character as a unit is caused to fight with an enemy unit. Therefore, by playing the game using a use character equipped with a skill in the skill trial game, the user can experience the effect achieved by equipping the use character with the skill, and can also infer the effect achieved in the case of equipping the possessed character corresponding to the use character with the skill in a normal game. The skill trial game and the normal games are the same type of games in the sense that a character that can be equipped with a skill (that is, a possessed character or a use character) is used, but do not have to have game contents and/or rules that are exactly the same. For example, one game and another game may have different number of characters to be used in the games, or may have different conditions for clearing the game in one stage.

In the present embodiment, the information processing system increases the experience value of a use character in accordance with the use character having made a predetermined motion in a stage (specifically, having attacked an enemy character, or having defeated an enemy character). In addition, when the experience value of the use character has reached a predetermined value, the information processing system increases the level of the use character by one, and increases parameters indicating the ability of the use character (for example, attack power, defense power, etc.)

The skill trial game and the normal games are the same in that the experience value of a character is increased in accordance with satisfaction of a condition, and the level of the character is increased in accordance with the experience value having reached a predetermined value. Here, the information processing system may make it easier to increase the experience value of a character in the skill trial game than in the normal games. In the skill trial game, one of the purposes is to allow the user to experience the effect achieved by using a character having various skills added thereto, and various skills are added to a use character as the game progresses. Thus, by making it easier to increase the experience value of a character, the game can be smoothly advanced.

The stage selection image also includes an interruption instruction image 35 for making an instruction to interrupt the skill trial game. In a state where the stage selection image is displayed, the information processing apparatus 2 accepts an instruction to interrupt the skill trial game (for example, an input of touching the interruption instruction image 35). When an instruction to interrupt the skill trial game is accepted, the information processing system interrupts the skill trial game. In the above game period, by making an instruction to start the skill trial game in the above menu, the user can restart the skill trial game. When the skill trial game is restarted, the level and the possessed skills of each use character are those before the interruption.

In the present embodiment, when a predetermined progress condition is satisfied in the skill trial game, the information processing system adds a skill to a use character. In the present embodiment, the progress condition is that the game in one stage is cleared. That is, by clearing the game in one stage in the skill trial game, the user can add a new skill to the use character. The progress condition may be any condition regarding the progress of the skill trial game. In another embodiment, the progress condition may be, for example, that the level of the use character is increased by one, that a specific enemy character is defeated, or that a specific item is acquired.

Figure 6:
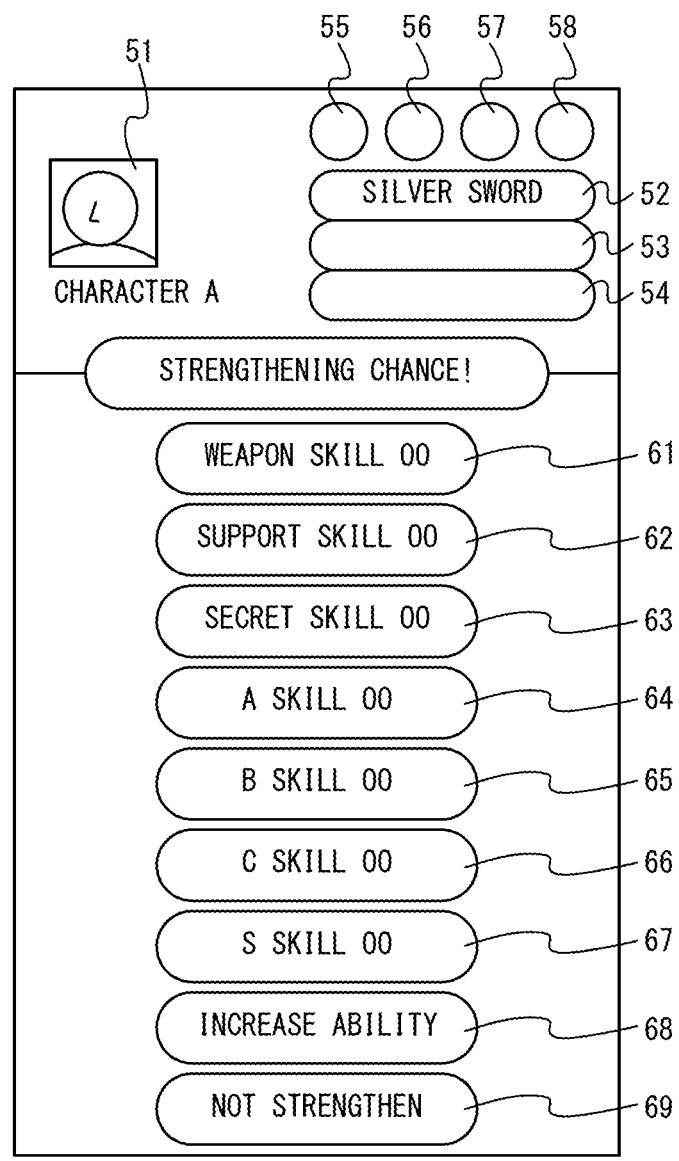
FIG. 6 shows an example of a non-limiting skill selection image.

In the present embodiment, when the game in one stage in the skill trial game has been cleared, the information processing apparatus 2 displays a skill selection image on the display section 24 after the end of the game in this stage. FIG. 6 shows an example of the skill selection image. The skill selection image is an image that serves as a user interface for the user to select a skill to be added to a use character.

As shown in FIG. 6, the skill selection image includes an addition character image 51 indicating a character that is a target to which a skill is to be added, among the use characters. Here, in the present embodiment, a use character that satisfies a predetermined character condition in a cleared stage is a target to which a skill is to be added. In the present embodiment, the character condition is that an enemy character is first defeated in the cleared stage. The character condition may be any condition regarding the skill trial game. In another embodiment, the character condition may be, for example, that the number of enemy characters defeated is the largest, or that the number of enemy characters defeated is the smallest. In addition, the character condition is not limited to a condition that can be satisfied only by one use character, and may be a condition that can be satisfied by a plurality of use characters. For example, the character condition may be that a predetermined number of enemy characters are defeated. In the case where there are a plurality of use characters that satisfy the character condition, the information processing system may add a skill to each of the plurality of use characters.

As described above, in the present embodiment, when the progress condition is satisfied, the information processing system adds a skill to a use character that satisfies the character condition regarding the skill trial game, among a plurality of use characters used for satisfying the progress condition. According to this, the user plays the game in the stage such that a use character to which the user desires to add a skill can satisfy the character condition. Thus, the strategic characteristics of the skill trial game can be improved, and the entertainment characteristics of the skill trial game can be improved.

The information processing system notifies the user that the character condition has been satisfied, in the game of a stage. In the present embodiment, for example, when a use character satisfies the character condition (that is, when the use character first defeats an enemy character), the information processing system may display a treasure chest together with an image representing that the enemy character has been defeated. Accordingly, the user can be notified that the character condition has been satisfied.

As shown in FIG. 6, the skill selection image includes skill images 52 to 58 indicating skills with which the use character are equipped at the present time (at the time before a skill is given through the skill selection image). Specifically, the skill images 52 to 54 indicate the names of skills with which the use character is equipped as a weapon skill, a support skill, and a secret skill, respectively. In addition, the skill images 55 to 58 indicate marks representing skills with which the use character is equipped as an A skill, a B skill, a C skill, and an S skill, respectively. In the example shown in FIG. 5, the use character (shown as "CHARACTER A" in FIG. 5) is equipped with only a skill "silver sword" as a weapon skill, and is not equipped with any skills in the groups other than the weapon skill group. Thus, in the example shown in FIG. 5, the skill images 53 to 58 regarding the groups other than the weapon skill group are blank. By presenting the skills of the use character at the present time, to which a skill is to be added, in the skill selection image to the user as described above, it is made easier for the user to select a skill.

As shown in FIG. 6, the skill selection image includes candidate skill images 61 to 67. The candidate skill images 61 to 67 indicate candidate skills that are candidates for a skill to be added to the use character. In the example shown in FIG. 6, each of the candidate skill images 61 to 67 indicates the name of a skill (in FIG. 6, for example, shown as "WEAPON SKILL OO" or the like). Each of the candidate skill images 61 to 67 may indicate explanation of the skill and/or the effect of the skill in addition to the name of the skill. In the present embodiment, by making an instruction to designate one of the candidate skill images 61 to 67 (for example, an input of touching this image), the user can add the skill indicated by the designated candidate skill image to the use character.

Each of the candidate skill images 61 to 67 indicate one of the skills in each of the above-described seven groups. As described above, in the present embodiment, for each skill group, one skill in one group is presented as a candidate skill to the user. Here, if the limitation that one skill in each group is a candidate skill is not provided, skills in a specific group may be consecutively and non-uniformly presented as candidate skills, resulting in a situation in which any skill in a certain group is not added to the use character over a long period of time. On the other hand, according to the present embodiment, the user can uniformly add a skill in each group to the use character without non-uniformly adding skills in a specific group to the use character.

In the present embodiment, the information processing system selects skills as candidate skills from among a plurality of skills that are prepared in the application and that can be possessed by the use character, so as to have randomness on the basis of probability. Here, "selecting so as to have randomness" does not only mean randomly selecting in a strict sense, and means selecting on the basis of probability such that the selection results for a plurality of times of selection are not the same. In the present embodiment, the information processing system performs a process of selecting a candidate skill from each of the seven groups.

Here, in the present embodiment, the skills prepared in the application also include skills that cannot be possessed by specific characters (or with which specific characters cannot be equipped). For example, there are skills with which only specific characters can be equipped (that is, with which characters other than the specific characters cannot be equipped). In addition, in the present embodiment, a soldier type (for example, walking soldier, cavalry, or the like) is set for each character, and there are skills with which only specific soldier types can be equipped. Therefore, the information processing system excludes the skills that cannot be possessed by the use character, from the candidate skill selection targets. For example, in the case where the soldier type of the use character is a walking soldier, the skills that can be possessed only by a cavalry are excluded from the candidate skill selection targets. According to the above, selection of a skill that cannot be possessed by the use character, as a candidate skill, resulting in the number of choices for a skill to be added to the use character being substantially decreased, can be inhibited.

In the present embodiment, the skills prepared in the application include a plurality of skills included in one category (referred to as same category skills). For each of a plurality of skills that are same category skills, an acquisition order is set. That is, regarding the same category skills, on the condition that a character possesses a skill having a lower acquisition order (that is, the acquisition order is earlier), the character can possess a skill having a higher acquisition order than this skill (that is, the acquisition order is later). In the present embodiment, a plurality of skills that are same category skills are skills that represent the same type of ability and that exert larger effects of the ability as the acquisition order becomes higher. For example, as a plurality of skills that are same category skills, three skills such as a skill to increase attack power by one, a skill to increase attack power by two, and a skill to increase attack power by three are conceivable.

In the present embodiment, among a plurality of skills that are same category skills, the information processing system sets only the skill having the highest acquisition order as a candidate skill selection target, and excludes the skills that do not have the highest acquisition order, from the candidate skill selection targets. Skills that are not same category skills are candidate skill selection targets. Therefore, in the present embodiment, whereas a condition for adding the skill having the highest acquisition order to a possessed character is that the possessed character is caused to possess skills of the same category as this skill, the skill having the highest acquisition order can be added to a use character without such a condition. As described above, in the present embodiment, the information processing system makes the condition for adding a skill to a use character looser than the condition for adding a skill to a possessed character. According to this, the user can more easily add a skill to a character in the skill trial game than in the normal games, and can easily confirm a skill having a large effect. For example, in the skill trial game in the present embodiment, the user can add a skill having the highest acquisition order to a use character without causing the use character to possess any skill having a lower acquisition order, and thus the user can immediately confirm the large effect of the skill having the highest acquisition order.

In the present embodiment, as described above, a plurality of skills that can be possessed by a use character include the above-described basic skills for the use character, and the above-described inheritance skills for the use character. In the present embodiment, both of these two types of skills are candidate skill selection targets, and thus can be selected as candidate skills.

Here, in the present embodiment, when selecting candidate skills, the information processing system sets a probability with which a basic skill for a use character is selected as a candidate skill, to be higher than a probability with which an inheritance skill for the use character is selected as a candidate skill. That is, the information processing system makes it easier to select a basic skill for the use character, as a candidate skill, than an inheritance skill for the use character. Here, whereas the basic skills of a character are often skills suitable for the ability of the character, inheritance skills other than the basic skills of the character also include skills that are not suitable for the ability of the character (although including skills suitable for the ability of the character). Thus, if only skills that are not suitable for the ability of a character are selected as candidate skills, a possibility that a skill attractive to the user (that is, a skill that the user desires to add) is not selected, is increased. On the other hand, in the present embodiment, by setting probabilities as described above, the possibility that a skill attractive to the user is not selected as a candidate skill, can be reduced.

Among the basic skills of a use character, for only some basic skills, probabilities with which the basic skills are selected as the candidate skills may be set to be higher than those for inheritance skills, and, for the other basic skills, probabilities may be set to be the same as those for inheritance skills. For example, among the basic skills of a use character, for only skills dedicated for the use character (that is, skills that are basic skills only for this use character), selection probabilities may be set to be higher than those for inheritance skills.

As described above, the information processing system adds at least one of skills selected from among a plurality of skills according to a predetermined rule. In the present embodiment, a rule of selection based on probability is used as the "predetermined rule", but the method for selecting a candidate skill is arbitrary. In another embodiment, the predetermined rule does not have to be a rule of selection based on probability and may be, for example, a rule based on the above acquisition order. Specifically, the predetermined rule may be a rule that, as for a plurality of skills that are the above-described same category skills, the skill having the lowest acquisition order among skills that are not possessed by a use character can be selected as a candidate skill, and the skills other than the skill having the lowest acquisition order, among the skills that are not possessed by the use character, are not selected as candidate skills. In addition, in another embodiment, the predetermined rule may be a rule that the user can freely designate a skill to be added, from among skills that can be possessed by a use character.

The information processing system selects candidate skills as described above, and displays the candidate skill images 61 to 67 indicating the selected candidate skills, respectively, on the display section 24. In addition, in the present embodiment, the skill selection image includes an ability increase image 68 and a strengthening unnecessary image 69 (see FIG. 6). The ability increase image 68 indicates an instruction to increase the ability of the use character. The strengthening unnecessary image 69 indicates an instruction to not strengthen the use character. In a state where the skill selection image is displayed, the information processing system accepts an instruction to designate one of the images 61 to 69 (for example, an input of touching an image). Therefore, in the present embodiment, in a state where the skill selection image is displayed, it is possible for the user to increase the ability of the use character and not to strengthen the use character, in addition to designating one skill from among the candidate skills. The information processing system may provide an upper limit (for example, ten times) for the number of times an instruction to increase the ability can be made for one use character.

When an instruction to designate one of the images 61 to 69 has been made, the information processing system executes a process corresponding to the designated image. That is, when an instruction to designate any one of the candidate skill images 61 to 67 has been made, the information processing system executes a process of adding the skill indicated by the designated candidate skill image, to the use character. In addition, when an instruction to designate the ability increase image 68 has been made, the information processing system executes a process of increasing the ability of the use character (for example, increasing the value of the parameter for attack power or defense power). Moreover, when an instruction to designate the strengthening unnecessary image 69 has been made, the information processing system ends the display of the skill selection image without executing a process of strengthening the use character such as the above process.

As described above, the information processing system adds a skill designated by the user among skills selected by random selection from among a plurality of skills, to the use character. According to this, since skills to be added to the use character are selected on the basis of the random selection, for example, skills that are not known to the user can be added in the skill trial game, and the user can try various skills. Accordingly, opportunities of adding various skills to the use character can be given to the user, and thus the entertainment characteristics regarding addition of a skill to the use character can be improved.

In the present embodiment, unlike a possessed character, a use character can possess only one skill per group, and can be automatically (that is, without any user's instruction) equipped with the possessed skill. Therefore, when newly adding a skill to the use character, if the use character already possesses (and is already equipped with) a skill in the same group as that of this skill, the information processing system deletes the already possessed skill and then adds the new skill.

As described above, in the present embodiment, for one use character, a predetermined number of skills (specifically, one skill) can be set per group. When newly adding, to a use character for which a predetermined number of skills in the same group are set, a skill in this group, the information processing system deletes one of the already set skills and adds the new skill to the use character. Accordingly, in the skill trial game, the user does not have to make an instruction to designate a skill with which a character is to be equipped, from among the skills possessed by the character, so that user's operations in the skill trial game can be simplified.

Due to the above, in the present embodiment, when the user makes an instruction to designate a skill to be added in a state where the skill selection image is displayed, the skill presently possessed by the use character is changed. Here, in the present embodiment, in a state where the skill selection image is displayed, the user can make an instruction to increase the ability of the use character or an instruction to not strengthen the use character, in addition to an instruction to designate a skill to be added. Therefore, when the user does not desire that the skill presently possessed by the use character is changed, the user can maintain the skill presently possessed by the use character, by making an instruction to increase the ability of the use character or an instruction to not strengthen the use character.

As described above, the user can add a skill to the use character each time the user clears the game in one stage. In the skill trial game, the user can increase the level of the use character and also add a skill to the use character by repeating the game in a stage. Accordingly, the user can strengthen the use character to achieve the goal of the skill trial game (for example, clearing the final stage).

In the skill trial game, the user can add a skill to a character without consuming a possessed character or an inheritance item, and thus it is made easier for the user to use the function of adding a skill to a character (that is, the function of skill inheritance). For example, in the present embodiment, users who do not actively add a skill to another possessed character by consuming an asset in the application such as a possessed character or an inheritance item can also be caused to use the function of skill inheritance in the skill trial game, and thus such users can be made aware of the fun of skill inheritance. For example, in the skill trial game, the user may add a skill that is not possessed by a possessed character, to a use character corresponding to the possessed character, and thus may find an effective combination of a character and a skill. When the user has found an effective combination in the skill trial game as described above, it is considered that the user desires to try the found combination for a possessed character and uses the function of skill inheritance for the possessed character. As described above, according to the present embodiment, motivation to use the function of skill inheritance for a possessed character can be given to the user by the skill trial game.

In the present embodiment, a character corresponding to a use character in the skill trial game (for example, a character having the same name and/or appearance, a character that is of the same character type such as soldier type, or the like) can be given as a possessed character to the user. That is, in a normal game, the user can use a possessed character corresponding to a use character used in the skill trial game. Accordingly, since the user desires to also use (a possessed character corresponding to) a use character in the skill trial game, in a normal game, the information processing system can give motivation to play a normal game, to the user by preparing the skill trial game.

In the present embodiment, when the same skill is added to each of a possessed character and a use character that correspond to each other, the skill has the same influence on the progress of a normal game using the possessed character and the progress of the second game using the use character. For example, when a skill to increase moving power of only a specific type of characters is added to a possessed character that is of the specific type and a use character that is of the specific type, the moving power of the possessed character and the moving power of the use character increase in the same manner. Therefore, in the present embodiment, the user can easily infer the ability of a possessed character to which a skill is added in a normal game, from a use character to which this skill is added in the skill trial game. Accordingly, stronger motivation to play the normal game due to playing the skill trial game can be given to the user.

In the present embodiment, the progress condition is a condition that can be satisfied a plurality of times in the skill trial game (that is, a condition that the game in a stage is cleared). The information processing system adds a skill to a use character each time the progress condition regarding the progress of the skill trial game is satisfied. Accordingly, when a skill has been added to a use character by the progress condition being satisfied as a result of a game in the skill trial game, the user desires to further play a game using the use character. Then, by the user further playing the game, the progress condition is satisfied again and a new skill is added to the use character, whereby motivation to further play the game is given to the user. Thus, according to the present embodiment, motivation to repeatedly play the skill trial game can be given to the user. In addition, each time the user plays the skill trial game, motivation to use the function of adding a skill can be given to the user.

In the present embodiment, the information processing system adds a skill to a possessed character on the condition that a first type of an asset (specifically, a possessed character or an inheritance item) possessed by the user in the application. Meanwhile, the information processing system adds a skill to a use character without consuming the first type of the asset as a condition (specifically, without consuming the asset). Due to the above, in the present embodiment, since the first type of the asset is not consumed, it can be said that it is made easier to equip a character with a skill in the skill trial game than in the normal games. It can also be said that the condition for adding a skill to a use character is set to be looser than the condition for adding a skill to a possessed character. By making it easier to equip a character with a skill in the skill trial game (or setting the condition for adding a skill to a use character to be looser than the condition for adding a skill to a possessed character) as described above, motivation to play the skill trial game can be given to the user.

The first type of the asset may be any asset possessed by the user in the application. For example, the first type of the asset may be an item to be used in the application (specifically, an item for performing the above-described random selection, or the like), or may be a point given to the user in the application.

In the present embodiment, at least one skill among a plurality of skills is associated with the first type of the asset (specifically, a possessed character or an inheritance item). When adding, to a certain character, a skill that is not associated with the character, the information processing system adds the skill associated with the first type of the asset to the character at least on the condition that the first type of the asset is consumed. Accordingly, since the type of an asset to be consumed for adding a skill to a possessed character is different depending on the skill to be added, the strategic characteristics regarding addition of a skill to a possessed character can be improved, and the entertainment characteristics of the game can be improved.

In the present embodiment, at least one skill (that is, a basic skill) is associated with a possessed character. Here, when adding, to a certain possessed character, a skill that is not associated with the possessed character, the information processing system adds the skill to the possessed character on the condition that the first type of the asset is consumed. Meanwhile, the information processing system can add both a skill (that is, a basic skill) that is associated with a use character and a skill (that is, an inheritance skill) that is not associated with the use character, to the use character. According to the above, the user can add both of the two types of skills to a use character in the skill trial game. For example, in the skill trial game, the user can try both the case of equipping a character with only a basic skill and the case of equipping a character with an inheritance skill in addition to a basic skill. As described above, according to the present embodiment, the user can try more combinations of a character and a skill in the skill trial game. In addition, also for a skill for which the condition is consumption of the first type of the asset when the skill is added to a possessed character, the user can try a combination of the skill and a character in the skill trial game without consuming the first type of the asset. Accordingly, the skill trial game can be made more useful for the user.

In the present embodiment, the information processing system can present both a skill that is associated with a use character and a skill that is not associated with the use character, as candidates (see FIG. 6), and adds a skill designated by the user from among the candidates, to the use character. Accordingly, the user can select a skill to be added to the use character, from among both of the two types of skills, and thus the convenience of the user regarding addition of a skill can be improved.

In another embodiment, the information processing system may give a reward to the user in accordance with the progress of a game in the skill trial game. For example, a reward may be given on the condition that a predetermined stage is cleared, or a reward may be given on the condition that the number of times a stage is cleared reaches a predetermined number of times. Accordingly, stronger motivation to play the skill trial game can be given to the user.

The reward may be, for example, the first type of the asset, or a second type of an asset that can be converted into the first type of the asset (for example, an item or a point that can be converted into the first type of the asset). Accordingly, it is made easier for the user to add a skill to a possessed character, by playing the skill trial game, and thus stronger motivation to play the skill trial game can be given to the user. The second type of the asset may be given as a reward in a normal game in addition to being given to the user as a reward in the skill trial game.

In the present embodiment, for a skill added to a possessed character, a skill use condition that can be satisfied by advancing a normal game (specifically, a condition that a skill point is consumed) is set. The information processing system sets a skill for which the skill use condition is satisfied, among skills added to a possessed character, to be in a state where this skill can be used by the possessed character (that is, equips the possessed character with this skill). Meanwhile, the information processing system sets a skill added to a use character, to be in a state where the skill can be used by the possessed character, regardless of whether or not the skill use condition is satisfied (specifically, without consuming a skill point). Due to the above, in the present embodiment, since the skill use condition is not imposed, it can be said that it is easier to equip a character with a skill in the skill trial game than in the normal games. By making it easier to equip a character with a skill in the skill trial game as described above, motivation to play the skill trial game can be given to the user.

In another embodiment, the information processing system may adopt a configuration in which the skill use condition is not set for a possessed character similar to a use character. Even with such a configuration, for example, in the case of adding a skill to a possessed character on the condition that the first type of the asset is consumed as described above, it can be said that it is easier to equip a character with a skill in the skill trial game than in the normal games.

3. Specific Example of Processing in Information Processing System

Next, a specific example of information processing in the information processing system will be described with reference to FIG. 7 to FIG. 10.

(3-1. Data to be Used for Information Processing)

Figure 7:
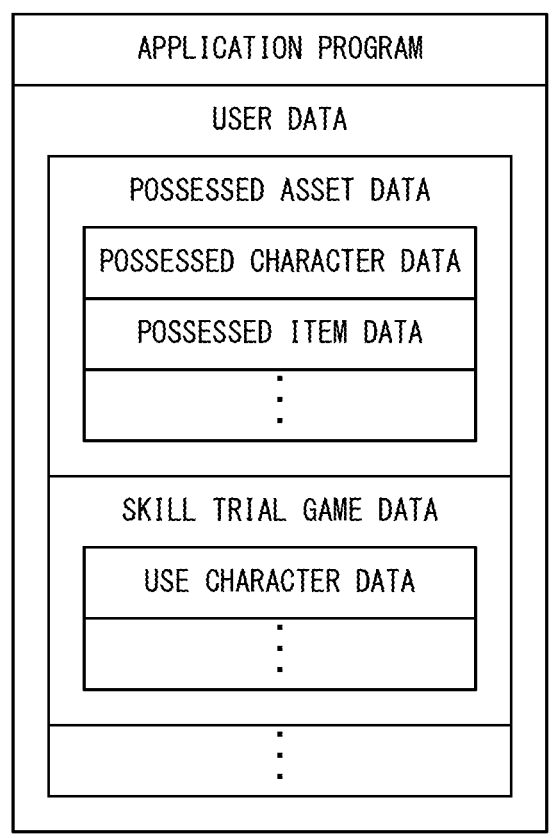
FIG. 7 shows an example of non-limiting various kinds of data to be used for information processing in the information processing system.

FIG. 7 shows an example of various kinds of data to be used for the information processing in the information processing system. The data shown in FIG. 7 are stored, for example, in the storage section 22 of the information processing apparatus 2 (or the memory of the processing section 21).

As shown in FIG. 7, the information processing apparatus 2 stores an application program (can also be referred to as a game program) therein. The application program is a program for executing the above-described application including the normal games and the skill trial game. An application process described later (see FIG. 8 and FIG. 9) is executed in the information processing apparatus 2 by the processing section 21 of the information processing apparatus 2 executing the application program.

As shown in FIG. 7, the information processing apparatus 2 stores therein user data to be used by the user in the application. In the present embodiment, the user data includes possessed asset data and skill trial game data. The user data may include data to be used in the normal games, in addition to the data shown in FIG. 7.

The possessed asset data indicates assets possessed by the user in the application. Specifically, the possessed asset data includes possessed item data and possessed character data. The possessed item data indicates information (for example, the types and number of items) regarding items (for example, the above-described inheritance item) possessed by the user in the application. The possessed character data indicates information regarding possessed characters possessed by the user in the application (for example, the names, levels, experience values, parameters indicating strength, possessed skills, etc., of the possessed characters). In addition, the possessed asset data includes data indicating points possessed by the user in the application (for example, the above-described skill points, and points that can be exchanged with an inheritance item).

The skill trial game data is data to be used in the skill trial game. In the present embodiment, the skill trial game data includes use character data. The use character data indicates information regarding use characters to be used in the skill trial game (for example, the names, levels, parameters indicating strength, possessed skills, etc., of use characters). In addition, the skill trial game data includes data indicating a progress status in the skill trial game (for example, a stage cleared by the user), and data indicating the above-described play points possessed by the user.

A part or all of the user data does not have to be always stored in the information processing apparatus 2, and may be acquired from the server 1 to the information processing apparatus 2 during execution of the application. At this time, a part or all of the user data is also stored in the server 1, and the user data stored in the server 1 and the user data stored in the information processing apparatus 2 are synchronized with each other at an appropriate timing.

The server 1 stores therein various kinds of data to be used in the games, such as data regarding each character that appears in the games and data regarding each skill. For example, the server 1 stores therein data that associates the above-described characters and basic skills with each other.

(3-2. Process in Information Processing Apparatus)

Figure 8:
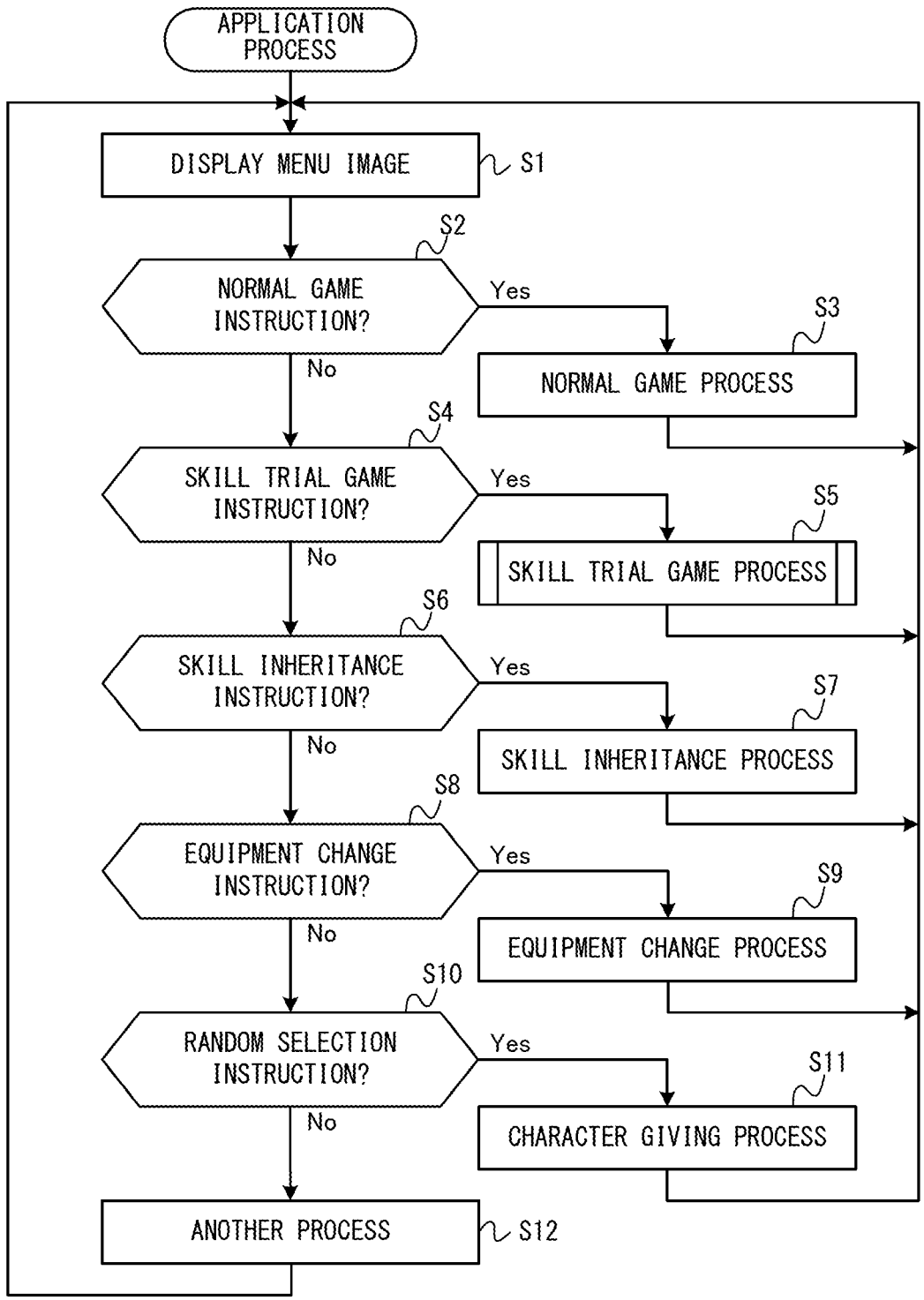
FIG. 8 is a flowchart showing an example of flow of a non-limiting application process executed by the information processing apparatus.

FIG. 8 is a flowchart showing an example of flow of an application process executed by the information processing apparatus. The application process shown in FIG. 8 is started in accordance with execution of the application program stored in the storage section 22.

Figure 9:
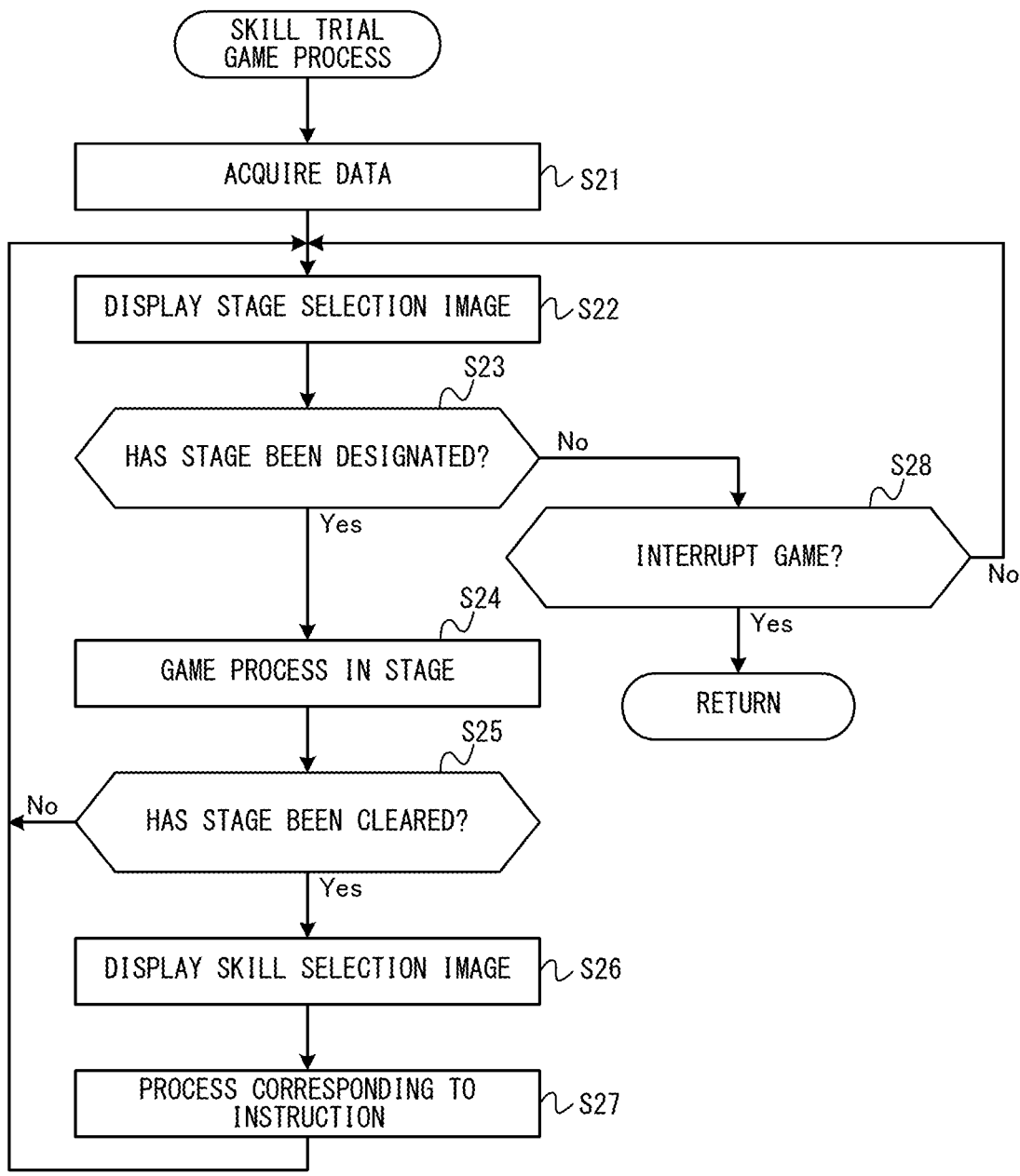
FIG. 9 is a sub flowchart showing an example of detailed flow of a skill trial game process in step S5 shown in FIG. 8.
Figure 10:
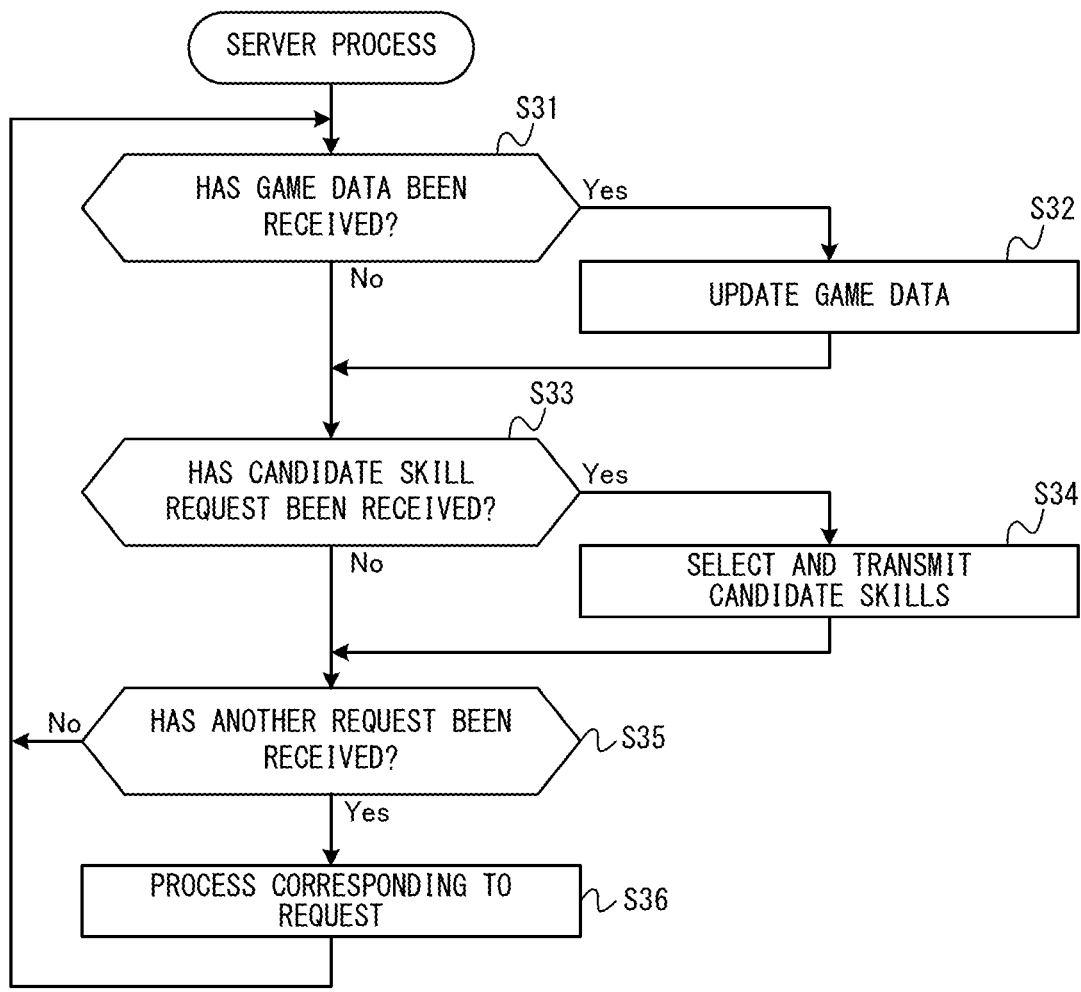
FIG. 10 is a flowchart showing an example of flow of a non-limiting server process.

In the present embodiment, it is assumed that the CPU (in other words, the processor) of the processing section 11 or 21 of the server 1 or the information processing apparatus 2 executes processes in steps shown in FIG. 8 to FIG. 10, by executing the application program stored in the storage section 12 or 22. However, in another embodiment, a part of the processes in the steps may be executed by a processor (for example, a dedicated circuit or the like) different from the CPU. When the information processing apparatus 2 is capable of communicating with the server 1, a part of the processes in the steps shown in FIG. 8 and FIG. 9 may be executed in the server 1. In addition, a part of the processes in the steps shown in FIG. 10 may be executed in the information processing apparatus 2. The processes in the steps shown in FIG. 8 to FIG. 10 are merely examples, and the processing order of the steps may be changed or another process may be executed in addition to (or instead of) the processes in the steps as long as similar results can be obtained.

The processing section 21 of the information processing apparatus 2 executes the processes in the steps shown in FIG. 8 and FIG. 9, by using the memory (or the storage section 22). That is, the CPU of the processing section 21 stores data obtained by each process step, in the memory, and reads out the data from the memory when using the data for the subsequent process steps. Similarly, the processing section 11 of the server 1 executes the processes in the steps shown in FIG. 10, by using the memory (or the storage section 12). That is, the CPU of the processing section 11 stores data obtained by each process step, in the memory, and reads out the data from the memory when using the data for the subsequent process steps.

In the application process shown in FIG. 8, first, in step S1, the processing section 21 displays a menu image on the display section 24. In the present embodiment, in a state where the menu image is displayed, the processing section 21 accepts at least the following five instructions (a) to (e).

(a) A normal game instruction to start a mode in which a normal game is executed.

(b) A skill trial game instruction to start a mode in which the skill trial game is executed.

(c) A skill inheritance instruction to start a mode in which skill inheritance is performed.

(d) An equipment change instruction to start a mode in which equipment for a possessed character is changed.

(e) A random selection instruction to start a mode in which a random selection for a character to be given to the user is performed.

In the present embodiment, the menu image includes instruction images for the user to make the five instructions, and the processing section 21 accepts an instruction to designate the instruction image. The application includes a plurality of types of normal games, and the menu image may include a plurality of instruction images indicating normal game instructions for the respective normal games. In addition, the instruction images for making the five instructions do not have to be included in one menu image, and a plurality of menu images may be used to include the instruction images. For example, as the menu image, a game mode menu image including instruction images each for starting a mode in which a game is executed (the above (a) and (b)), a setting menu image including instruction images each for performing change of setting regarding a possessed character (the above (c) and (d)), and a random selection menu image for performing the random selection may be prepared. In this case, the processing section 21 may switch and display these three menu images on the display section 24 in accordance with an instruction made by the user. Next to step S1, the process in step S2 is executed.

In step S2, the processing section 21 determines whether or not the normal game instruction has been made in the menu image by the user. When the determination result in step S2 is positive, the process in step S3 is executed. On the other hand, when the determination result in step S2 is negative, the process in step S4 is executed.

In step S3, the processing section 21 executes a normal game process for executing a game in a normal game. Specifically, the processing section 21 executes a game process regarding the normal game for which the normal game instruction has been made, among the plurality of types of normal games. The content of the game process in the normal game is arbitrary. For example, the processing section 21 executes a game process for advancing the normal game in accordance with a game operation of the user by using the possessed character data stored in the storage section 22. When the normal game ends, the processing section 21 ends the process in step S3. Next to step S3, the process in step S1 is executed again.

In step S4, the processing section 21 determines whether or not the skill trial game instruction has been made in the menu image by the user. When the determination result in step S4 is positive, the process in step S5 is executed. On the other hand, when the determination result in step S4 is negative, the process in step S6 is executed.

In step S5, the processing section 21 executes a skill trial game process for executing a game in the skill trial game. The skill trial game process will be described in detail later (see FIG. 9). When the skill trial game process ends, the processing section 21 ends the process in step S5. Next to step S5, the process in step S1 is executed again.

In step S6, the processing section 21 determines whether or not the skill inheritance instruction has been made in the menu image by the user. When the determination result in step S6 is positive, the process in step S7 is executed. On the other hand, when the determination result in step S6 is negative, the process in step S8 is executed.

In step S7, the processing section 21 executes a skill inheritance process for performing the above-described skill inheritance. In the skill inheritance process, the processing section 21 accepts an instruction to designate a possessed character that is an inheritance destination, a possessed character or an inheritance item that is an inheritance source, and a skill to be inherited. When the above instruction has been made, the processing section 21 executes a process of deleting the possessed character or the inheritance item that is an inheritance source, and adding the designated skill to the possessed character that is an inheritance destination. At this time, the processing section 21 updates the user data stored in the storage section 22, such the content after the skill inheritance is indicated. A specific condition in the skill inheritance is as described above in "(2-3. Skill inheritance)". When the above skill inheritance process ends, the processing section 21 ends the process in step S7. Next to step S7, the process in step S1 is executed again.

In step S8, the processing section 21 determines whether or not the equipment change instruction has been made in the menu image by the user. When the determination result in step S8 is positive, the process in step S9 is executed. On the other hand, when the determination result in step S8 is negative, the process in step S10 is executed.

In step S9, the processing section 21 executes an equipment change process. The equipment change process is a process of equipping a possessed character with the skill designated by the user, among a plurality of skills that can be possessed by the possessed character. That is, the processing section 21 sets the skill for which the above skill use condition is satisfied, among the skills added to the possessed character, to be in a state where this skill can be used by the possessed character to which this skill is added. At this time, the processing section 21 updates the user data stored in the storage section 22, such that the content after the equipment change process is indicated. Next to step S9, the process in step S1 is executed again.

In step S10, the processing section 21 determines whether or not the random selection instruction has been made in the menu image by the user. When the determination result in step S10 is positive, the process in step S11 is executed. On the other hand, when the determination result in step S10 is negative, the process in step S12 is executed.

In step S11, the processing section 21 executes a character giving process. The character giving process is a process of giving a character selected by the above-described random selection performed in accordance with an instruction of the user. In the character giving process, the processing section 21 transmits a random selection request indicating a request of the random selection, to the server 1 by using the communication section 25 (in other words, via the communication section 25). Upon receiving the random selection request, the server 1 performs the random selection, thereby determining a character to be given to the user. Then, the server 1 transmits data indicating the determined character, to the information processing apparatus 2, and the processing section 21 receives the data via the communication section 25. At this time, the processing section 21 updates the user data stored in the storage section 22, such that the content after the character giving process is indicated. Next to step S11, the process in step S1 is executed again.

In step S12, the processing section 21 executes a process corresponding to another instruction different from the above five instructions. The other instruction and the content of the process are arbitrary. For example, the processing section 21 executes a process for the user to purchase an item to be used in the application (for example, an item for performing the above random selection). When the process in step S12 ends, the processing section 21 executes the process in step S1 again.

Although not shown in FIG. 8, the processing section 21 ends the application process in accordance with an instruction to end the application being made by the user during execution of the application process.

FIG. 9 is a sub flowchart showing an example of detailed flow of the skill trial game process in step S5 shown in FIG. 8. In the skill trial game process, first, in step S21, the processing section 21 acquires data to be used in the skill trial game (that is, the above skill trial game data) from the server 1. Specifically, the processing section 21 transmits an acquisition request indicating a request to acquire the skill trial game data, to the server 1 by using the communication section 25 (in other words, via the communication section 25). Upon receiving the acquisition request, the server 1 transmits the skill trial game data stored in the server 1, to the information processing apparatus 2 (step S36 described later). The processing section 21 receives the skill trial game data by using the communication section 25 and stores the skill trial game data in the storage section 22. In the present embodiment, the skill trial game data is not stored in the information processing apparatus 2 at the end of the application, but a part or the entirety of the skill trial game data may be stored in the information processing apparatus 2. Next to step S21, the process in step S22 is executed.

In step S22, the processing section 21 displays the stage selection image on the display section 24 (see FIG. 5). Then, the processing section 21 accepts an instruction to designate a stage in which a game is executed, and an instruction to interrupt the skill trial game. Next to step S22, the process in step S23 is executed.

In step S23, the processing section 21 determines whether or not an instruction to designate a stage has been made by the user. When the determination result in step S23 is positive, the process in step S24 is executed. On the other hand, when the determination result in step S23 is negative, the process in step S28 described later is executed.

In step S24, the processing section 21 executes a game process for advancing the game in the stage designated by the user. For example, the processing section 21 advances the game in the designated stage by using the use character data stored in the storage section 22, in accordance with a game operation of the user. In addition, in the game process, the processing section 21 determines whether or not the use character has satisfied the above-described character condition. In the present embodiment, the game in the stage ends when the user clears the game or when the game is over. When the game ends, the processing section 21 ends the process in step S24 and executes the process in step S25.

In step S25, the processing section 21 determines whether or not the game executed in step S24 has been cleared by the user. That is, the processing section 21 determines whether or not the above-described progress condition has been satisfied. When the determination result in step S25 is positive, the process in step S26 is executed. On the other hand, when the determination result in step S25 is negative, the processes in steps S26 and S27 are skipped, and the process in step S22 described above is executed again.

In step S26, the processing section 21 displays the skill selection image on the display section 24 (see FIG. 6). Specifically, first, the processing section 21 transmits a candidate skill request to request acquisition of candidate skills, to the server 1 by using the communication section 25. Data of the candidate skill request includes data indicating a use character to which a skill is to be added. Upon receiving the candidate skill request, the server 1 selects candidate skills from among the skills prepared in the application, and transmits data indicating the selected candidate skills, to the information processing apparatus 2 (step S34 described later). The processing section 21 generates a skill selection image on the basis of the data indicating the candidate skills and received by using the communication section 25, and displays the skill selection image on the display section 24. Then, the processing section 21 accepts an instruction to designate one of the candidate skills, an instruction to increase the ability of the use character, and an instruction not to strengthen the use character. Next to step S26, the process in step S27 is executed.

In step S27, the processing section 21 executes a process corresponding to the instruction accepted in the skill selection image. That is, when an instruction to designate one skill from among the candidate skills has been made, the processing section 21 executes a process of adding the designated skill to the use character. In addition, an instruction to increase the ability of the use character has been made, the processing section 21 executes a process of increasing the ability of the use character. At this time, the processing section 21 updates the use character data stored in the storage section 22, such that the content after the above process is indicated. When an instruction not to strengthen the use character has been made, the processing section 21 does not update the use character data stored in the storage section 22 and ends the process in step S27. After the process in step S27, the process in step S22 described above is executed again.

Meanwhile, in step S28, the processing section 21 determines whether or not an instruction to interrupt the skill trial game has been made by the user. When the determination result in step S28 is positive, the processing section 21 ends the skill trial game process shown in FIG. 9. On the other hand, when the determination result in step S28 is negative, the process step S22 described above is executed again.

In the application process, the processing section 21 transmits game data to be used in the game, to the server 1 at an appropriate timing. For example, at a timing when the normal game process in step S3 ends, the processing section 21 transmits game data indicating a game result of the normal game, to the server 1. In addition, at a timing when the game process in step S24 ends, the processing section 21 transmits game data indicating a game result of the game, to the server 1. Moreover, at a timing when the possessed skills of the possessed character or the use character are changed (for example, step S7, S9, or S27), the processing section 21 transmits game data indicating the content after the change, to the server 1.

(3-3. Process in Server)

Next, an example of a process executed in the server 1 (referred to as "server process") will be described. FIG. 10 is a flowchart showing an example of flow of the server process. A series of processes shown in FIG. 10 is continuously executed during operation of the server 1.

In step S31, the processing section 11 determines whether or not data to be used in a game (for example, game data transmitted at a timing of step S3, S7, S9, S24, or S27 described above) has been received from the information processing apparatus 2 via the communication section 13. When the determination result in step S31 is positive, the process in step S32 is executed. On the other hand, when the determination result in step S31 is negative, the process in step S33 is executed.

In step S32, the processing section 11 updates the game data stored in the storage section 12, on the basis of the game data received in the process in step S31. That is, regarding the received game data, the processing section 11 updates the content of the game data stored in the storage section 12, such that the content of the game data stored in the storage section 12 matches the content of the game data stored in the information processing apparatus 2. Next to step S32, the process in step S33 is executed.

In step S33, the processing section 11 determines whether or not the above-described candidate skill request has been received from the information processing apparatus 2 via the communication section 13. When the determination result in step S33 is positive, the process in step S34 is executed. On the other hand, when the determination result in step S33 is negative, the process in step S35 is executed.

In step S34, the processing section 11 selects candidate skills from among the skills prepared in the application. That is, on the basis of the data indicating the use character and included in the data of the received candidate skill request, the processing section 11 selects candidate skills corresponding to the use character. A specific method for selecting candidate skills is as described above in "(2-4. Skill trial game)". Furthermore, the processing section 11 transmits data indicating the selected candidate skills, to the information processing apparatus 2 by using the communication section 13. Next to step S34, the process in step S35 is executed.

In step S35, the processing section 11 determines whether or not data indicating another request different from the candidate skill request has been received from the information processing apparatus 2 via the communication section 13. The other request is, for example, a request to acquire the above-described skill trial game data (see step S21), the above-described random selection request (step S11), or the like. When the determination result in step S35 is positive, the process in step S36 is executed. On the other hand, when the determination result in step S35 is negative, the process in step S31 is executed again.

In step S36, the processing section 11 executes a process corresponding to the request received in step S35. A specific content of the process executed in step S36 is arbitrary. For example, when a request to acquire data to be used in a game has been received, the processing section 11 generates data related to the request on the basis of the data stored in the storage section 12, and transmits the data to the information processing apparatus 2 by using the communication section 13. In addition, for example, when the random selection request has been received, the processing section 11 determines a character to be given to the user, by random selection, and transmits data indicating the determined character, to the information processing apparatus 2. After step S36, the process in step S31 is executed again.

4. Function and Effect of Present Embodiment, and Modifications

As described in the above embodiment, the information processing system executes an application including a plurality of games using characters to each of which at least one of a plurality of skills capable of influencing progress of a game can be added, and includes the following means.

First game execution means configured to execute a first game (a normal game in the above embodiment) that is one of the plurality of games and uses a possessed character that is a character possessed by a user (step S3).

First addition means configured to add at least one skill among the plurality of skills, to the possessed character on the basis of designation by the user, wherein the at least one skill satisfies a condition for being designated by the user (step S7).

Second game execution means configured to execute a second game (the skill trial game in the above embodiment) that is different from the first game among the plurality of games and uses a use character prepared to be used in the second game (step S24).

Second addition means configured to add at least one skill among the plurality of skills to the use character in accordance with progress of the second game (for example, in accordance with a condition regarding the second game, such as the above-described progress condition, being satisfied) (step S27).

According to the above configuration, in addition to adding a skill to a possessed character, the information processing system can also add a skill to a use character different from the possessed character. Accordingly, it is made easier for the user to use the function of adding a skill to a character. For example, the user can try a combination of a character and a skill by adding the skill to a use character even without actually adding the skill to a possessed character.

The "(at least one) skill that can be used by the user" means a skill that the user has a right to add to a possessed character. For example, in the above embodiment, when the user possesses a character that possesses the skill, or an inheritance item corresponding to the character, it can be said that the skill is a "skill that can be used by the user". In another embodiment, for example, when the user possesses an item representing the skill itself, and the skill can be added to a possessed character on the condition that the item is consumed, it can be said that the skill is a "skill that can be used by the user".

The above embodiment can be used, for example, for a game program and a game system, for the purpose of making it easier for the user to use the function of adding a skill to a character, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein an information processing program for use with an information processing apparatus to execute an application, the application including a plurality of games using characters to each of which at least one of a plurality of skills influencing progress of a game is added, the information processing program configured to cause one or more processors of the information processing apparatus to execute operations comprising:

executing a first game, which is one of the plurality of games, by using a possessed character that is possessed by a user, wherein each character that is possessed by the user is associated with at least one of the plurality of skills;

adding at least one skill among the plurality of skills to the possessed character on the basis of designation by the user, wherein said at least one skill satisfies a condition for being designated by the user, wherein an in-game asset is consumed when the at least one skill that is added to the possessed character is not associated with the possessed character;

executing a second game that is different from the first game among the plurality of games and uses a use character assigned to be used in the second game;

adding at least one skill among the plurality of skills to the use character in accordance with progress of the second game, wherein the at least one skill is added to the use character without requiring consumption the in-game asset regardless whether the at least one skill is associated or not with the use character;

prior to a character corresponding to the use character being given to the user for use in the first game, determining that a giving condition is satisfied; and based on satisfaction of the giving condition, executing a process of setting the character corresponding to the use character as the possessed character that is used in the first game by the user, wherein the character corresponding to the use character has a skill among the plurality of skills that have been added to the use character by the user during progress of the second game, wherein a first skill that is added to the use character in the second game is a skill that is not associated with the possessed character in the first game and would otherwise have required consumption of the in-game asset to be added to the possessed character in the first game.

2. The storage medium according to claim 1, wherein the one or more processors execute a first game using the possessed character that is a character possessed by the user, among the characters, and the one or more processors execute a second game using the use character assigned to be used in the second game, among the characters.

3. The storage medium according to claim 1, wherein, when the same skill is added to each of the possessed character and the use character that correspond to each other, the skill has the same influence on the progress of the second game in which the use character is used, as on progress of the first game in which the possessed character is used.

4. The storage medium according to claim 1, wherein the one or more processors add at least one skill selected from among the plurality of skills according to a predetermined rule, to the use character.

5. The storage medium according to claim 4, wherein the one or more processors add a skill designated by the user among skills selected from among the plurality of skills by random selection, to the use character.

6. The storage medium according to claim 1, wherein the one or more processors add a skill to the use character each time a progress condition regarding the progress of the second game is satisfied.

7. The storage medium according to claim 6, wherein, when the progress condition is satisfied, the one or more processors add a skill to the use character that satisfies a character condition regarding the second game, among a plurality of the use characters used for satisfying the progress condition.

8. The storage medium according to claim 1, wherein the one or more processors limit a number of times the user plays the second game per unit period.

9. The storage medium according to claim 1, wherein
the plurality of skills are classified into a plurality of groups, and
a predetermined number of skills are allowed to be added to one use character per group.

10. The storage medium according to claim 9, wherein, when newly adding, to the use character to which the predetermined number of skills in the same group have been added, a skill in the group, the one or more processors delete one of the already added skills and adds the new skill to the use character.

11. The storage medium according to claim 1, wherein
the one or more processors add a skill to the possessed character on a condition that an in-application asset possessed by the user in the application is consumed, and
the one or more processors adds a skill to the use character without consuming the in-application asset as a condition.

12. The storage medium according to claim 11, wherein the one or more processors present both a skill that is associated with the use character and a skill that is not associated with the use character, as candidates, and add a skill designated by the user among the candidates, to the use character.

13. The storage medium according to claim 11, wherein
at least one skill among the plurality of skills is associated with the in-application asset, and
when adding, to a certain character, a skill that is not associated with the character, the one or more processors add a skill associated with the in-application asset possessed by the user in the application, to the character at least on a condition that the in-application asset is consumed.

14. The storage medium according to claim 11, wherein the one or more processors give the in-game asset and/or a type of an asset that is different from the in-game asset and convertible into the in-application asset, to the user in accordance with the progress of the second game.

15. The storage medium according to claim 1, wherein
a skill use condition that is satisfied by advancing the first game is set for skills added to the possessed character,
the information processing program further causes the one or more processors to execute setting a skill for which the skill use condition is satisfied, among the skills added to the possessed character, to be in a state where the skill is used by the possessed character to which the skill is added, and
the one or more processors set a skill added to the use character to be in a state where the skill is used by the possessed character, regardless of whether or not the skill use condition is satisfied.

16. The non-transitory computer-readable storage medium of claim claim 1, wherein the character corresponding to the use character that is set to the possessed character has the first skill.

17. An information processing system for executing an application, the information processing system comprising:
computer memory configured to store the application including a plurality of games using characters to each of which at least one of a plurality of skills influencing progress of a game is added
one or more hardware processors coupled to the computer memory, the one or more processors configured to perform operations comprising:
executing a first game, which is one of the plurality of games, by using a possessed character that is usable by a user within the first game, wherein each character that is usable in the first game is associated with at least one of the plurality of skills;
adding at least one skill among the plurality of skills to the possessed character on the basis of designation by the user, wherein said at least one skill satisfies a condition for being designated by the user, wherein an in-game asset is consumed when the at least one skill that is added to the possessed character is not associated with the possessed character;
executing a second game that is different from the first game among the plurality of games, execution of the second using a use character that is assigned to be used in the second game;
adding at least one skill among the plurality of skills to the use character in accordance with progress of the second game, wherein the at least one skill is added to the use character without requiring consumption the in-game asset regardless whether the at least one skill is associated or not with the use character;
prior to a character corresponding to the use character being given to the user for use in the first game, determining that a giving condition is satisfied; and
based on satisfaction of the giving condition, executing a process of assigning the character corresponding to the use character as a character that is usable by the user within the first game, wherein the character corresponding to the use character has at least one skill among the plurality of skills that have been added to the use character by the user during progress of the second game,
wherein a first skill that is added to the use character in the second game is a skill that is not associated with the possessed character in the first game and would otherwise have required consumption of the in-game asset to be added to the possessed character in the first game.

18. An information processing apparatus for executing an application, the information processing apparatus comprising:
> one or more processors, wherein the application includes a plurality of games using characters to each of which at least one of a plurality of skills influencing progress of a game is added, the one or more processors configured to execute the application to perform operations comprising:
>> executing a first game that is one of the plurality of games and using a possessed character that is set to be usable by a user within the first game, wherein each character that is usable in the first game is associated with at least one of the plurality of skills;
>> adding at least one skill among the plurality of skills to the possessed character on the basis of designation by the user, wherein said at least one skill satisfies a condition for being designated by the user, wherein an in-game asset is consumed when the at least one skill that is added to the possessed character is not one that is associated with the possessed character;
>> executing a second game that is different from the first game among the plurality of games and using a use character that is assigned to be used in the second game;
>> adding at least one skill among the plurality of skills to the use character in accordance with progress of the second game, wherein the at least one skill is added to the use character without requiring consumption the in-game asset regardless whether the at least one skill is associated or not with the use character;
>> prior to a character corresponding to the use character being given to the user for use in the first game, determining that a giving condition is satisfied; and
>> based on satisfaction of the giving condition, executing a process of setting the character corresponding to the use character as the possessed character that is used in the first game by the user, wherein the character corresponding to the use character has at least one skill among the plurality of skills that have been added to the use character by the user during progress of the second game,
> wherein a first skill that is added to the use character in the second game is a skill that is not associated with the possessed character in the first game and would otherwise have required consumption of the in-game asset to be added to the possessed character in the first game.

19. An information processing method executed in an information processing system for executing an application, wherein the application includes a plurality of games using characters to each of which at least one of a plurality of skills influencing progress of a game is added, the method comprising:
> executing a first game that is one of the plurality of games and using a possessed character that is a character possessed by a user, wherein each character that is usable in the first game is associated with at least one of the plurality of skills;
> adding at least one skill among the plurality of skills to the possessed character on the basis of designation by the user, wherein said at least one skill satisfies a condition for being designated by the user, wherein an in-game asset is consumed when the at least one skill that is added to the possessed character is not associated with the possessed character;
> executing a second game that is different from the first game among the plurality of games and using a use character prepared to be used in the second game;
> adding at least one skill among the plurality of skills to the use character in accordance with progress of the second game, wherein the at least one skill is added to the use character without requiring consumption the in-game asset regardless whether the at least one skill is associated or not with the use character;
> prior to a character corresponding to the use character being given to the user for use in the first game, determining that a giving condition is satisfied; and
> based on satisfaction of the giving condition, executing a process of setting the character corresponding to the use character as the possessed character that is used in the first game by the user, wherein the character corresponding to the use character has at least one skill among the plurality of skills that have been added to the use character by the user during progress of the second game,
> wherein a first skill that is added to the use character in the second game is a skill that is not associated with the possessed character in the first game and would otherwise have required consumption of the in-game asset to be added to the possessed character in the first game.

* * * * *